US008272629B2

(12) United States Patent
Kuroda

(10) Patent No.: US 8,272,629 B2
(45) Date of Patent: Sep. 25, 2012

(54) SWING CLAMP APPARATUS

(75) Inventor: Takayuki Kuroda, Hyogo (JP)

(73) Assignee: Pascal Engineering Corporation, Hyogo (JP)

( * ) Notice: Subject to any disclaimer, the term of this patent is extended or adjusted under 35 U.S.C. 154(b) by 1199 days.

(21) Appl. No.: 11/990,951

(22) PCT Filed: Feb. 21, 2006

(86) PCT No.: PCT/JP2006/303049

§ 371 (c)(1),
(2), (4) Date: Mar. 31, 2008

(87) PCT Pub. No.: WO2007/043197

PCT Pub. Date: Apr. 19, 2007

(65) Prior Publication Data

US 2009/0146356 A1 Jun. 11, 2009

(30) Foreign Application Priority Data

Oct. 14, 2005 (JP) .................... PCT/JP2005/018946

(51) Int. Cl.
*B23Q 3/08* (2006.01)
*B23Q 3/06* (2006.01)

(52) U.S. Cl. ................. 269/27; 269/24; 269/32; 269/35

(58) Field of Classification Search .................... 269/27, 269/24, 25, 32, 28–35
See application file for complete search history.

(56) References Cited

U.S. PATENT DOCUMENTS

| | | | | |
|---|---|---|---|---|
| 4,164,344 | A * | 8/1979 | Deragne | 269/27 |
| 5,013,015 | A * | 5/1991 | Fatheree | 269/24 |
| 5,192,058 | A * | 3/1993 | VanDalsem et al. | 269/24 |
| 5,192,063 | A * | 3/1993 | Peterson et al. | 269/257 |
| 5,778,511 | A * | 7/1998 | Keaton | 29/559 |
| 6,113,086 | A * | 9/2000 | Yonezawa | 269/24 |
| 6,663,093 | B2 * | 12/2003 | Yonezawa et al. | 269/24 |
| 6,736,384 | B2 * | 5/2004 | Yokota | 269/32 |
| 6,929,254 | B2 * | 8/2005 | Steele et al. | 269/24 |
| 7,111,834 | B2 * | 9/2006 | Steele et al. | 269/24 |
| 7,290,480 | B2 * | 11/2007 | Rentz | 92/136 |
| 7,793,802 | B2 * | 9/2010 | Knox et al. | 222/183 |
| 2003/0094741 | A1 * | 5/2003 | Kitaura | 269/20 |
| 2009/0152784 | A1 * | 6/2009 | Yonezawa et al. | 269/32 |

FOREIGN PATENT DOCUMENTS

| | | |
|---|---|---|
| JP | 8-229835 | 9/1996 |
| JP | 9-070728 | 3/1997 |
| JP | 9-183035 | 7/1997 |
| JP | 2004-223640 | 8/2004 |
| JP | 2005-028535 | 2/2005 |

* cited by examiner

*Primary Examiner* — Lee D Wilson
*Assistant Examiner* — Alvin Grant
(74) *Attorney, Agent, or Firm* — Jordan and Hamburg LLP

(57) ABSTRACT

A swing clamp apparatus is provided in which the clamp arm is positioned and attached to a clamp rod at a desired position in a simple and reliable manner and the clamp arm replacement workload is certainly reduced. The swing clamp apparatus comprises an attachment block fixed to the leading end of a clamp rod and to which a clamp arm is detachably attached and a pair of clamping force transmission pins inserted in the attachment block and clamp arm in the direction parallel to the orthogonal direction to the axis for coupling the positioned clamp arm to the attachment block in an integrated manner.

18 Claims, 12 Drawing Sheets

SWING CLAMP APPARATUS

BACKGROUND OF THE INVENTION

The present invention relates to a swing clamp apparatus in which the clamp arm is reciprocated and swung.

Conventionally, the swing clamp apparatus comprises a clamp body, a clamp rod, a clamp arm, and a drive mechanism. The clamp rod is inserted in and supported by the clamp body reciprocally in the axial direction and rotatably about the axis. The clamp arm is fixed to the leading end of the clamp rod. The drive mechanism is provided in the clamp body to reciprocate and rotate the clamp rod so as to switch the clamp arm between an unclamping position and a clamping position where the clamp arm is retracted in the axial direction and swung about the axis in relation to the unclamping position.

In the above swing clamp apparatus, the clamp arm may be replaced with different ones in size or shape when a clamping object is changed. Usually the clamp arm is directly fixed to the clamp rod by bolts. For example, in the clamp apparatus of Patent Document 1, the clamp arm has an axial bore in which the leading end of the clamp rod is inserted and a slit continued from the axial bore. A bolt is inserted in the clamp arm through the slit so that the bolt fastens and directly secures the clamp arm to the clamp rod.

The clamp arm reciprocates and swings in the swing clamp apparatus. Therefore, the clamp arm has to be positioned and fixed to the clamp rod at a desired position for reliably clamping and unclamping a clamping object.

Patent Document 1: U.S. Pat. No. 5,192,063 Publication

SUMMARY OF THE INVENTION

The invention is directed to a swing clamp apparatus, including a clamp body, clamp rod, clamp arm and drive structure, along with an attachment block and at least one clamping force transmission pin. The clamp rod is supported by the clamp body reciprocally in an axial direction thereof and rotatably around an axis thereof. The clamp arm is attached to a leading end of the clamp rod. The drive structure reciprocates and rotates the clamp rod to switch the clamp arm between an unclamping position and a clamping position where the clamp arm is retracted in the axial direction and swung about the axis in relation to the unclamping position. The attachment block is fixed to the leading end of said clamp rod and to which the clamp arm is detachably attached. The at least one clamping force transmission pin is inserted in the attachment block and clamp arm in the direction parallel to the orthogonal direction to the axis for coupling the positioned clamp arm to said attachment block in an integrated manner.

DETAILED DESCRIPTION OF THE INVENTION

Problems Solved

Figure 1:
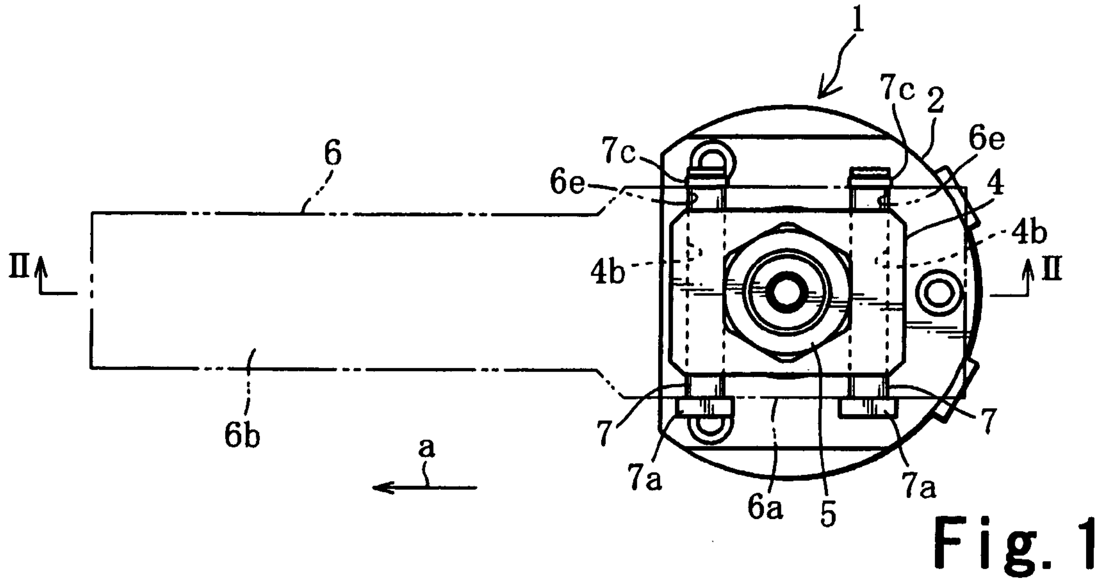
FIG. 1 is a plan view of the swing clamp apparatus of Embodiment 1.

The prior art swing clamp apparatus basically does not have a function to position the clamp arm on the clamp rod. Therefore, for replacing the clamp arm, a heavy workload is required for positioning and fixing the clamp arm to the clamp rod at a desired position. If the clamp arm is frequently replaced when the clamping object is changed, it is significantly inconvenient to execute a heavy workload of positioning and fixing the clamp arm to the clamp rod.

The clamp apparatus of Patent Document 1 directly attaches the clamp arm to the clamp rod and has a function to position the clamp arm on the clamp rod in the axial direction but no function to position it in the rotative direction about the axis. Therefore, the same problem as the above occurs.

The purpose of the present invention is to provide a swing clamp apparatus in which the clamp arm is positioned and fixed to the clamp rod at a desired position in a simple and reliable manner and the clamp arm replacement workload is certainly reduced.

The swing clamp apparatus of the present first invention is a swing clamp apparatus comprising a clamp body, a clamp rod supported by the clamp body reciprocally in an axial direction thereof and rotatably around an axis thereof, a clamp arm attached to a leading end of the clamp rod, and a drive means for reciprocating and rotating the clamp rod to switch the clamp arm between an unclamping position and a clamping position where the clamp arm is retracted in the axial direction and swung about the axis in relation to the unclamping position, characterized by comprising an attachment block fixed to the leading end of the clamp rod and to which the clamp arm is detachably attached and at least one clamping force transmission pin inserted in the attachment block and clamp arm in the direction parallel to the orthogonal direction to the axis for coupling the positioned clamp arm to the attachment block in an integrated manner.

The swing clamp apparatus of the present second invention is a swing clamp apparatus comprising a clamp body, a clamp rod supported by the clamp body reciprocally in an axial direction thereof and rotatably around an axis thereof, a clamp arm attached to a leading end of the clamp rod, and a drive means for reciprocating and rotating the clamp rod to switch the clamp arm between an unclamping position and a clamping position where the clamp arm is retracted in the axial direction and swung about the axis in relation to the unclamping position, characterized by that the apparatus further comprises an attachment block fixed to the leading end of the clamp rod and to which the clamp arm is detachably attached; a clamping force transmission pin provided to one of the attachment block and clamp arm in a direction parallel to an orthogonal direction to the axis; and a pin engagement provided to the other of the attachment block and clamp arm and engaging with the pin for coupling the clamp arm mounted to the attachment block in an integrated manner and, when the clamp arm is attached/detached to/from the attachment block, the pin engages/disengages with/from the pin engagement in the direction orthogonal to the axis and to the center line of the pin.

Advantages

The swing clamp apparatus of the present first invention particularly comprises an attachment block fixed to the leading end of the clamp rod and to which the clamp arm is detachably attached and at least one clamping force transmission pin inserted in the attachment block and clamp arm in the direction parallel to the orthogonal direction to the axis for coupling the positioned clamp arm to the attachment block in an integrated manner. Therefore, in replacing the clamp arm, first, the clamping force transmission pin is removed from the attachment block and clamp arm to decouple the attachment block and clamp arm. Then, the clamp arm is removed from the attachment block, and a new clamp arm is mounted on the attachment block. The clamping force transmission pin is inserted in the attachment block and clamp arm in the direction parallel to the orthogonal direction to the axis to couple the positioned clamp arm to the attachment block in an integrated manner. In other words, the attachment block is prepositioned and fixed to the clamp rod at a desired position; then, the clamp arm may be positioned and attached to the clamp rod (attachment block) in a simple and reliable manner. The clamp arm may simply be attached to the attachment block by the clamping force transmission pin without fastening it, reducing the clamp arm replacement workload. Particularly, it is significantly convenient that the clamp arm replacement workload is remarkably reduced where the clamp arm is frequently replaced.

According to an embodiment of the present invention, the attachment block has a positioner for positioning the clamp arm in the axial direction and in the rotative direction about the axis. Therefore, the clamp arm may be positioned at a coupling point in a simple and reliable manner by mounting the clamp arm on the attachment block. In this state, the clamping force transmission pin is easily inserted in the attachment block and clamp arm and consequently the clamp arm replacement may be done in a simpler and more reliable manner.

According to an embodiment of the present invention, the clamp arm is fitted on the attachment block, reliably inserting the clamping force transmission pin in the attachment block and clamp arm in the direction parallel to the orthogonal direction to the axis, by which the clamping force transmission pin reliably integrally couples the positioned clamp arm to the attachment block.

According to an embodiment of the present invention, the attachment block is formed as a rectangular block and the clamp arm has a rectangular bore in which the attachment block is fitted. The clamp arm is reliably positioned on the attachment block in the rotative direction about the axis using a simple structure.

According to an embodiment of the present invention, the clamp rod has at the leading end a tapered shaft part having a diameter deceased toward the tip and the attachment block has a tapered axial bore in which the tapered shaft part is fitted. Therefore, pushed in the retracting direction, the attachment block can reliably be pressed against and secured to the leading end of the clamp rod.

According to an embodiment of the present invention, the attachment block has a axial bore in which the leading end of the clamp rod is fitted and a separator continued from the axial bore and a fastening bolt is provided to fasten and elastically deform the attachment block via the separator, whereby the attachment block is pressed against and secured to the leading end of the clamp rod. Therefore, the attachment block can reliably be pressed against and secured to the leading end of the clamp rod.

According to the swing clamp apparatus of the present second invention, particularly, an attachment block fixed to the leading end of the clamp rod and to which the clamp arm is detachably attached is provided, one of the attachment block and clamp arm has a clamping force transmission pin oriented in the direction parallel to the orthogonal direction to the axis, and the other of the attachment block and clamp arm has a pin engagement engaging with the pin for integrally coupling the mounted clamp arm to the attachment block and, when the clamp arm is attached/detached to/from the attachment block, the pin engages/disengages with/from the pin engagement in the direction orthogonal to the axis and to the center line of the pin. Therefore, in replacing the clamp arm, the pin is disengaged from the pin engagement to remove the clamp arm from the attachment block while the pin stays on one of the attachment block and clamp arm. Then, the pin on one of the attachment blocks and a new clamp arm is engaged with the pin engagement on the other to attach the new clamp arm to the attachment block.

When the clamp arm is mounted on the attachment block, the pin engages with the pin engagement to couple the positioned clamp arm to the attachment block in an integrated manner. The clamping force of the clamp rod is transmitted from the attachment block to the clamp arm via the pin. More specifically, the attachment block is pre-positioned and fixed to the clamp rod at a desired position and, then, the clamp arm is positioned and attached to the clamp rod (attachment block) at desired position. The pin engages/disengages with/from the pin engagement to attach/detach the clamp arm to/from the attachment block without attaching/detaching the pin. Consequently, the clamp arm replacement workload is significantly reduced. Particularly, it is significantly convenient that the clamp arm replacement workload is remarkably reduced where the clamp arm is frequently replaced.

According to an embodiment of the present invention, a pin hole is formed through the attachment block and clamp arm in the direction parallel to the center line of the pin and a clamping force transmission pin is inserted in the pin hole. Therefore, the clamp arm may be attached/detached to/from the attachment block while the clamping force transmission pin is removed from the pin hole. With the clamp arm being mounted on the attachment block, the clamping force transmission pin may be inserted in the pin hole to reliably couple the attachment block and clamp arm. The clamping force of the clamp rod is reliably transmitted from the attachment block to the clamp arm via the clamping force transmission pin and pin.

According to an embodiment of the present invention, the pin and clamping force transmission pin are provided on either side of the clamp rod in the longitudinal direction of the clamp arm. Therefore, the clamping force of the clam rod is effectively transmitted from the attachment block to the clamp arm via the pin and clamping force transmission pin.

According to an embodiment of the present invention, a clamping force transmission pin member is inserted in one of the attachment block and clamp arm and the clamping force transmission pin member constitutes the pin. Therefore, the pin can easily be provided to one of the attachment block and clamp arm, which is advantageous for production.

According to an embodiment of the present invention, the attachment block is formed as a rectangular block, the clamp arm has a forked part in the base end part, and the part of the clamp arm including the forked part forms a housing recess that is open at the base end and in which the attachment block is fitted. Therefore, for replacing the clamp arm, the engaging/disengaging of the pin with/from the pin engagement, namely the attachment/detachment of the clamp arm to/from the attachment block, can reliably be done and the clamp arm can reliably be positioned and attached to the attachment block.

According to an embodiment of the present invention, pairs of the pins and pin engagements are symmetrically provided in the width direction of aid clamp arm, the pair of pins is closer to the base end of the clamp arm than the clamping force transmission pin and protrudes from the attachment block in the directions away from each other, and the pair of pin engagements consists of a pair of U-shaped grooves notched in the forked part of the clamp arm from the base end. Therefore, a pair of pin engagements having a simple structure allows the reliable engagement/disengagement of a pair of pins with/from a pair of pin engagements.

According to an embodiment of the present invention, the pin is closer to the base end of the clamp arm than the clamping force transmission pin and provided across the forked part of the clamp arm, and the pin engagement consists of a U-shaped groove notched in the attachment block from the base end.

According to an embodiment of the present invention, the pin has on the outer periphery abutment surfaces that abut against smooth surfaces parallel to the orthogonal direction to the axis of the pin engagement. Therefore, the area pressure the pin receives from the pin engagement is reduced to prevent the pin and pin engagement from being damaged.

EMBODIMENTS OF THE PRESENT INVENTION

In specific embodiments of the present invention, the swing clamp apparatus comprises a clamp body, a clamp rod supported by the clamp body reciprocally in the axial direction thereof and rotatably around the axis thereof, a clamp arm attached to the leading end of the clamp rod, and a drive means for reciprocating and rotating the clamp rod to switch the clamp arm between an unclamping position and a clamping position where the clamp arm is retracted in the axial direction and swung about the axis in relation to the unclamping position.

Embodiment 1

As shown in FIGS. 1 to 7, a swing clamp apparatus 1 comprises a clamp body 2, a clamp rod 3, an attachment block 4, a block retaining nut 5, a clamp arm 6, a pair of clamping force transmission pins 7, and a drive mechanism 8. Here, the explanation is made with the assumption that the arrow a in FIG. 1 indicates the forward direction and the arrow b in FIG. 2 indicates the upward direction.

Figure 2:
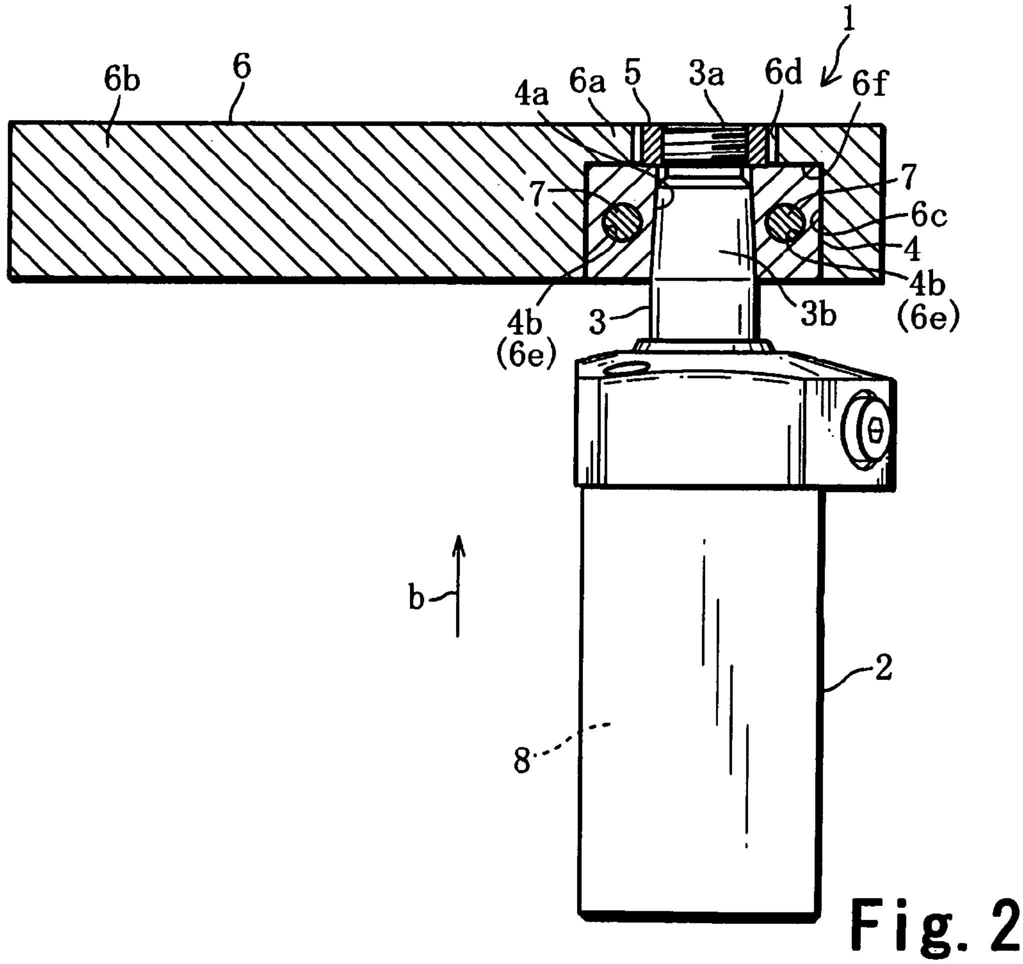
FIG. 2 is a cross-sectional view at the line II-II in FIG. 1.
Figure 3:
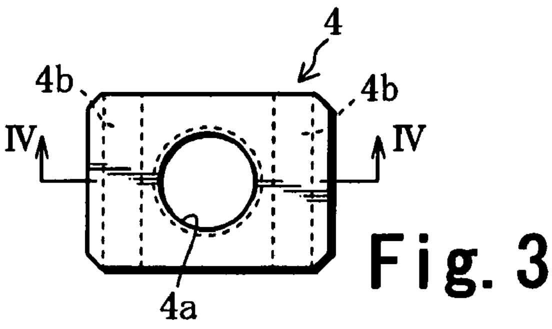
FIG. 3 is a plan view of the attachment block.
Figure 4:
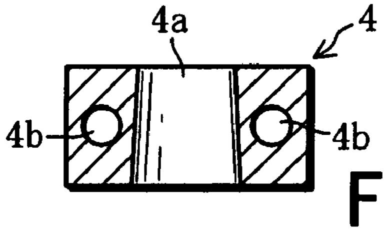
FIG. 4 is a cross-sectional view at the line IV-IV in FIG. 3.
Figure 5:
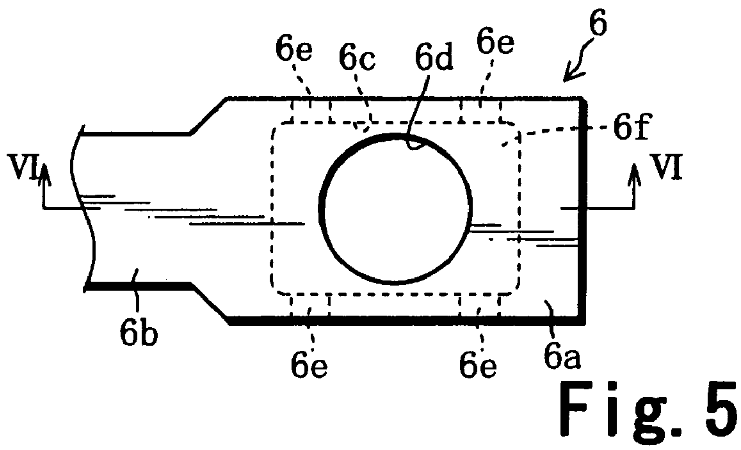
FIG. 5 is a plan view of the clamp arm.
Figure 6:
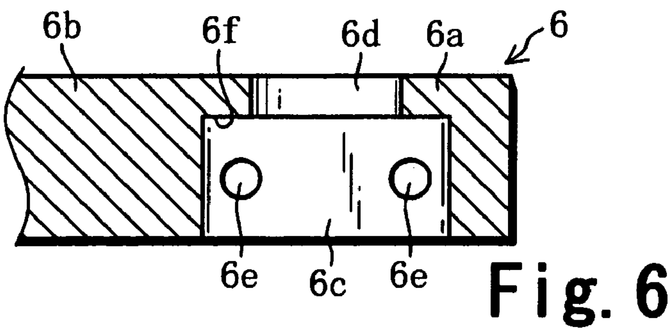
FIG. 6 is a cross-sectional view at the line VI-VI in FIG. 5.

As shown in FIGS. 1 and 2, the clamp body 2 is cylindrical and attached to a stationary platen to which a clamping object is anchored. The clamp rod 3 is inserted in and supported by the clamp body 2 reciprocally in the axial direction (vertical direction) and rotatably about the axis with the upper part protruding upward from the clamp body 2. The clamp rod 3 has a threaded part 3*a* at the leading end (top end). The leading end of the clamp rod 3 except for the threaded part 3*a* forms a tapered shaft part 3*b* having a diameter decreased toward the tip.

As shown in FIGS. 1 to 4, the attachment block 4 is in the form of a rectangular block. More specifically, the attachment block 4 has a rectangular form smaller than the clamp body 2 in the plan view and larger in the longitudinal direction than in the transverse direction, having a thickness in the vertical direction nearly equal to the vertical dimension of the tapered shaft part 3*b* of the clamp rod 3.

The attachment block 4 has in the center a vertically penetrating tapered axial bore 4*a* in which the tapered shaft part 3*b* of the clamp rod 3 is fitted. With the tapered shaft part 3*b* being fitted in the tapered axial bore 4*a*, the threaded part 3*a* of the clamp rod 3 protrudes upward from the attachment block 4. The attachment block 4 has a pair of transversely (in the direction parallel to the orthogonal direction to the axis) elongated pin holes 4*b* formed through either end part in the longitudinal direction.

As shown in FIGS. 1 and 2, the block retaining nut 5 is screwed on the threaded part 3*a* of the clamp rod 3 from above and abuts against the top surface of the attachment block 4 outside the outer periphery of the tapered axial bore 4*a*. The block retaining nut 5 presses the attachment block 4 downward so that the inner periphery surface of the tapered axial bore 4*a* of the attachment block 4 is pressed against and secured to the tapered shaft part 3*b* of the clamp rod 3.

As shown in FIGS. 1, 2, 5, and 6, the clamp arm 6 has a coupling part 6*a* at the base end and an arm part 6*b* extending forward from the coupling part 6*a* in an integrated manner. The coupling part 6*a* is detachably fitted on the attachment block 4 from above. The coupling part 6*a* has a rectangular form larger than the attachment block 4 in the plan view and has a thickness in the vertical direction nearly equal to the vertical dimension of the threaded part 3*a* and tapered shaft part 3*b* of the clamp rod 3.

The coupling part 6*a* has an open-bottom rectangular bore 6*c* in which the attachment block 4 is fitted from below and an open-top circular bore 6*d* continued upward from the middle of the rectangular bore 6*c* and in which the block retaining nut 5 is fitted from below. The coupling part 6*a* further has two pairs of transversely elongated pin holes 6*e* in either end part in the longitudinal direction. The pin holes 6*e* in each pair transversely pass thorough the right and left sidewalls facing the rectangular bore 6*c* of the coupling part 6*a*. The pin holes 6*e* have the same diameter as the pin holes 4*b* of the attachment block 4.

The coupling part 6*a* has outside the outer periphery of the circular bore 6*d* a step 6*f* having an underside facing the rectangular bore 6*c*. When the attachment block 4 is fitted in the rectangular bore 6*c* and the step 6*f* is placed on the attachment block 4, the clamp arm 6 is positioned in the axial direction and in the rotative direction about the axis and mounted on the attachment block 4 with the pin holes 4*b* and 6*e* being aligned. Here, the rectangular bore 6*c* and step 6*f* constitute the positioner.

Figure 7:
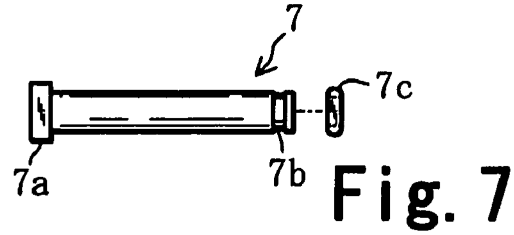
FIG. 7 is a front view of the clamping force transmission pin.

As shown in FIGS. 1, 2, and 7, a pair of clamping force transmission pins 7 has nearly the same diameter as the pin holes 4*b* and 6*e* and has a head 7*a* at the base end and an annular groove 7*b* at the leading end. With the clamp arm 6 being mounted on the attachment block 4, the pair of clamping force transmission pins 7 is inserted in the pin holes 4*b* and 6*e* in the direction parallel to the orthogonal direction to the axis. Then, stopper rings 7*c* (O-rings) are provided in the annular grooves 7*b* of the clamping force transmission pins 7 protruding outside the pin holes 6*e* for retention. The clamping force transmission pins 7 couple the positioned clam arm 6 to the attachment block 4 in an integrated manner.

The drive mechanism 8 is provided in the cylinder body 2 for reciprocating and rotating the clamp rod 3 so as to switch the clamp arm 6 between an unclamping position and a clamping position where the clamp arm is retracted in the axial direction (moved downward) and swung about the axis in relation to the unclamping position. The drive mechanism 8 has, for example, a double-action hydraulic cylinder capable of driving the clamp rod 3 both upward and downward, or a single-action hydraulic cylinder driving the clamp rod 3 downward or upward and a spring member biasing the clamp rod 3 upward or downward.

Here, a guide mechanism (not shown) guiding the clamp rod 3 driven by the drive mechanism 8 in the vertical direction and in the rotative direction is provided in order to realize a specific clamping/unclamping operation (switching the clamp arm 6 between the unclamping position and the clamping position)

For clamping a clamping object, the clamp rod 3 is retracted by the drive mechanism 8 from the unclamping position of the clamp arm 6 and the clamping force due to the driving force is transmitted to the clamp arm 6 via the pair of clamping force transmission pins 7, whereby the clamping object is pressed by the clamp arm 6. The drive mechanism 8 and guide mechanism are not explained in detail here. For example, those disclosed in the Japanese Laid-Open Patent Application Nos. 2004-268187 and 2005-28535 may be used.

Functions and advantages of the above described swing clamp apparatus 1 will be described hereafter. For replacing the clamp arm 6, first, the pair of clamping force transmission pins 7 is removed from the pin holes 4*b* and 6*e* of the attachment block 4 and clamp arm 6 to disengage the clamp arm 6 from the attachment bock 4. Then, the clamp arm 6 is removed from the attachment block 4.

Then, a new clamp arm 6 is mounted on the attachment block 4. Then, the clamp arm 6 is positioned on the attachment block 4, whereby the pin holes 4*b* of the attachment block 4 and the pin holes 6*e* of clamp arm 6 are aligned. Then, the pair of clamping force transmission pins 7 is inserted in the pin holes 4*e* and 6*e* in the direction parallel to the orthogonal direction to the axis to couple the positioned clamp arm 6 to the attachment block 4 in an integrated manner.

As described above, the attachment block 4 is pre-positioned and fixed to the clamp rod 3 at a desired position, whereby the clamp arm 6 may be positioned and attached to the clamp rod 3 (attachment block 4) at a desired position in a simple and reliable manner. The clamp arm 6 can easily be attached to the attachment block 4 by the clamping force transmission pins 7 without fastening it. Consequently, the workload of replacing the clamp arm 6 can certainly be reduced. Particularly, it is significantly convenient that the workload of replacing the clamp arm 6 can remarkably be reduced where the clamp arm 6 is frequently replaced.

The rectangular bore 6*c* and step 6*f* are provided as a means for positioning the clamp arm 6 on the attachment block 4 in the axial direction and in the rotative direction about the axis. Therefore, mounted on the attachment block 4, the clamp arm 6 is positioned thereon at a coupling position in a simple and reliable manner. In this state, the pair of clamping force transmission pins 7 is easily inserted in the pin holes 4*b* and 6*e* of the attachment block 4 and clamp arm 6. Consequently, the clamp arm 6 may be replaced in a simpler and more reliable manner.

The attachment block 4 is in the form of a rectangular block and the clamp arm 6 has a rectangular bore 6*c* in which the attachment block 4 is fitted. In other words, the clamp arm 6 is fitted on the attachment block 4 and a pair of clamping force transmission pins 7 is reliably inserted in the attachment block 4 and clamp arm 6 in the direction parallel to the orthogonal direction to the axis, whereby the clamping force transmission pins 7 reliably couple the positioned clamp arm 6 to the attachment block 4 in an integrated manner. Furthermore, the clamp arm 6 is reliably positioned on the attachment block 4 in the rotative direction about the axis using a simple structure.

The clamp rod 3 has at the leading end a tapered shaft part 3*b* having a diameter decreased toward the tip and the attachment block 4 has a tapered axial bore 4*a* in which the tapered shaft part 3*b* is fitted. Therefore, pressed by the block retaining nut 5 in the axially retracting direction, the attachment block 4 is reliably pressed against and secured to the leading end of the clamp rod 3.

Embodiment 2

As shown in FIGS. 8 to 14, a swing clamp apparatus 11 comprises a clamp body 12, a clamp rod 13, an attachment block 14, a block fastening bolt 15, a clamp arm 16, a pair of clamping force transmission pins 17, and a drive mechanism 8. Here, the explanation is made with the assumption that the arrow a in FIG. 8 indicates the forward direction and the arrow b in FIG. 9 indicates the upward direction.

Figure 8:
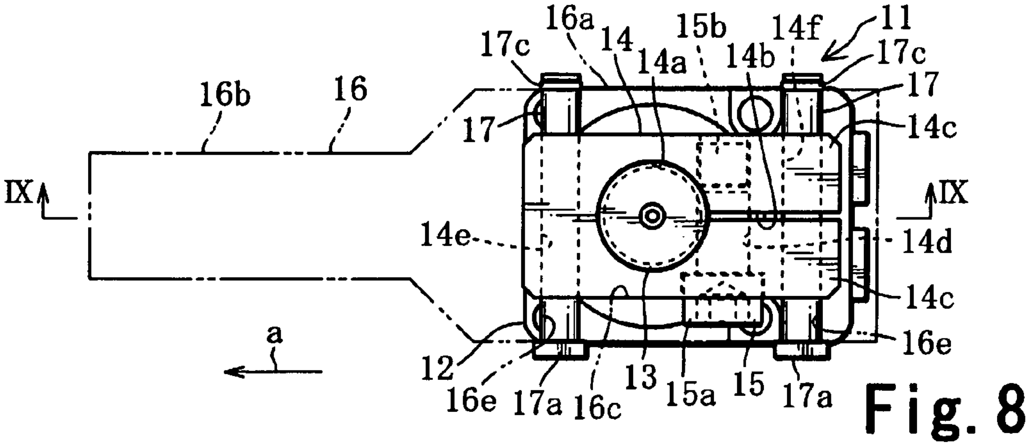
FIG. 8 is a plan view of the swing clamp apparatus of Embodiment 2.
Figure 9:
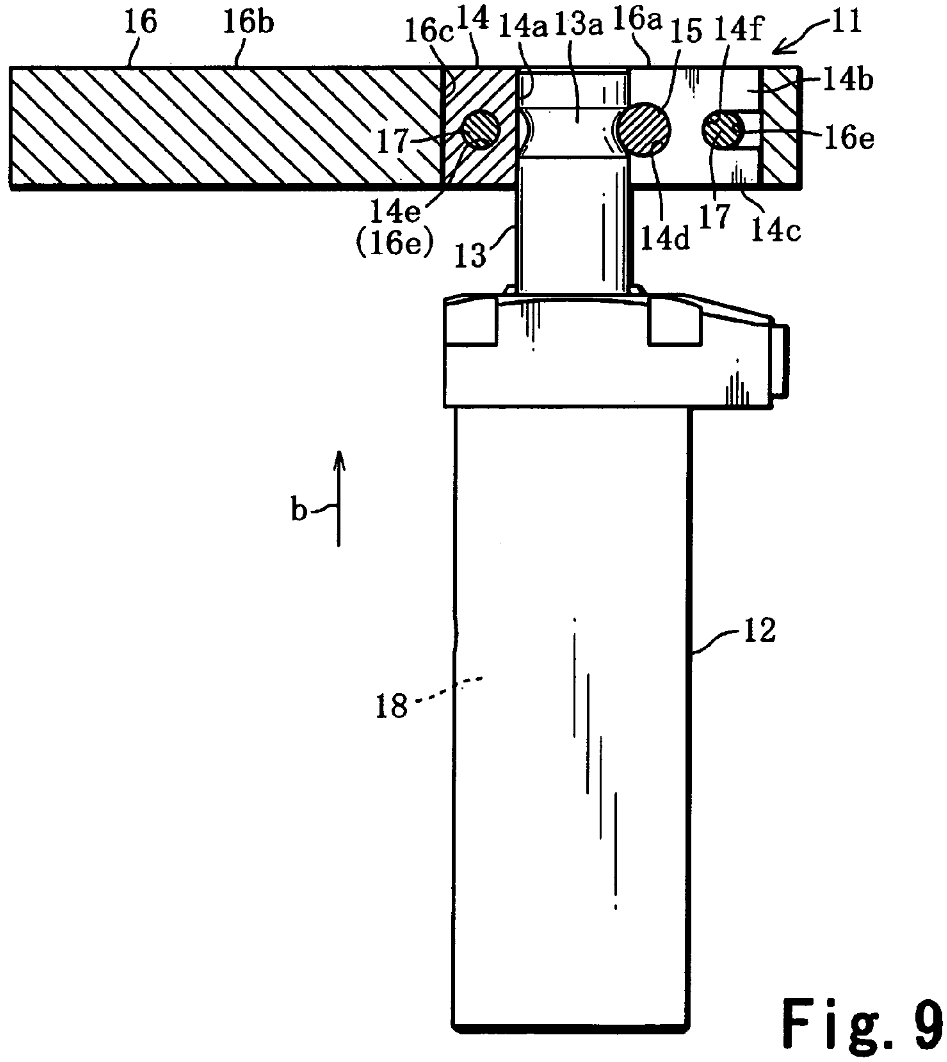
FIG. 9 is a cross-sectional view at the line IX-IX in FIG. 8.
Figure 10:
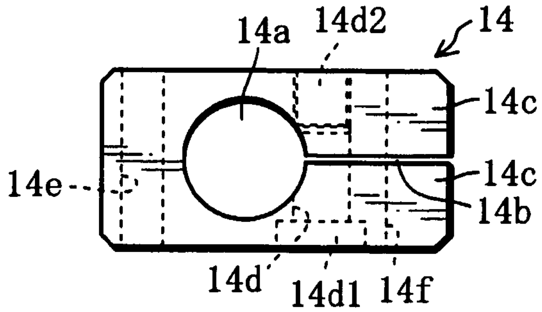
FIG. 10 is a plan view of the attachment block.
Figure 11:
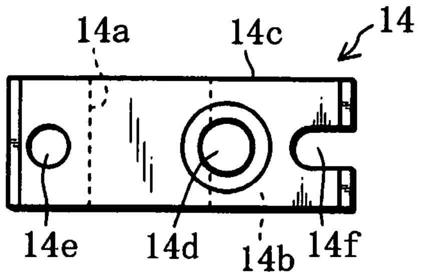
FIG. 11 is a side view of the attachment block.
Figure 12:
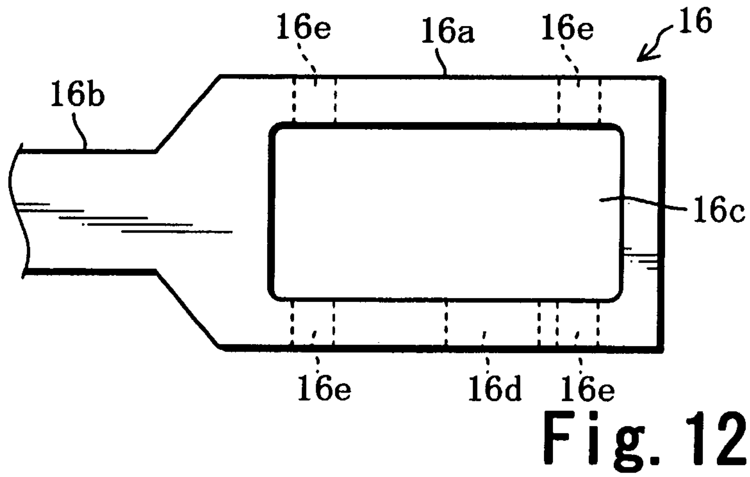
FIG. 12 is a plan view of the clamp arm.
Figure 13:
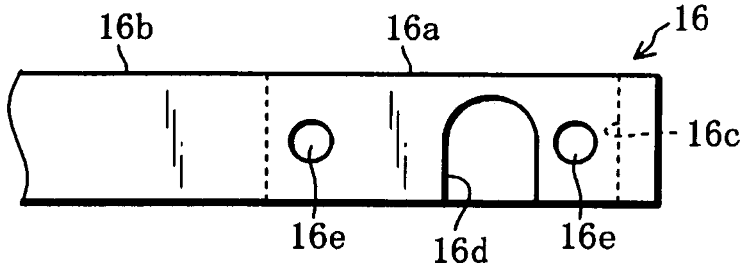
FIG. 13 is a side view of the clamp arm.

As shown in FIGS. 8 and 9, the clamp body 12 and drive mechanism 18 have the same functions as the clamp body 2 and drive mechanism 8 of Embodiment 1. The swing clamp apparatus 11 has the same guide mechanism as of Embodiment 1. Therefore, the detailed explanation regarding the clamp body 12, drive mechanism 18, and guide mechanism is omitted. The clamp rod 13 is inserted in and supported by the clamp body 12 reciprocally in the axial direction and rotatably about the axis with the upper part protruding upward from the clamp body 12. The clamp rod 13 has an overall straight form and an annular groove 13*a* at the leading end.

As shown in FIGS. 8 to 11, the attachment block 14 is in the form of a rectangular block. More specifically, the attachment block 14 has a rectangular form smaller than the clamp body 12 in the plan view and larger in the longitudinal direction than in the transverse direction, having a thickness in the vertical direction approximately three times larger than the vertical dimension of the annular groove 13*a* of the clamp rod 13.

The attachment block 14 has an axial bore 14*a* formed axially through it at a position slightly shifted toward the front from the center, in which the leading end of the clamp rod 13 is fitted. The attachment block 14 has a longitudinal slit 14*b* as a separator extending from the axial bore 14*a* to the rear end.

The slit 14*b* separates the attachment block 14 in the entire rear part from the axial bore 14*a* in the transverse direction to create separated parts 14*c*.

The attachment block 14 has a transversely elongated bolt hole 14*d* formed transversely through it at a position slightly shifted backward from the center. The bolt hole 14*d* passes through the front part of the slit 14*b* and partly overlaps with the axial bore 14*a* at the midpoint of its length. The bolt hole 14*d* has a large-diameter hole 14*d*1 at the right end and a threaded hole 14*d*2 at the left end.

The attachment block 14 has a transversely elongated pin hole 14*e* formed transversally through the front end part. The attachment block 14 (separated parts 14*c*) has a notch 14*f* formed from the rear end toward the front across the entire width and having a vertical dimension equal to the diameter of the pin hole 14*e*.

As shown in FIGS. 8 and 9, the block fastening bolt 15 has nearly the same diameter as the bolt hole 14*d* and has a head 15*a* at the base end and a threaded shaft part 15*b* at the leading end. The leading end of the clamp rod 13 is inserted in the axial bore 14*a* of the attachment block 14. With the annular groove 13*a* and bolt hole 14*d* being aligned in the vertical direction, the block fastening bolt 15 is inserted in the bolt hole 14*d* and engages with the annular groove 13*a*. The head 15*a* is partly fitted in the large-diameter hole 14*d*1 and the threaded shaft part 15*b* is screwed in the threaded hole 14*d*2. In this state, the leading surface of the clamp rod 13 and the top surface of the attachment block 14 are nearly at the same level.

The block fastening bolt 15 engages with the annular groove 13*a*, whereby the attachment block 14 is vertically positioned in relation to the clamp rod 13. When the right and left separated parts 14*b* are fastened by the block fastening bolt 15 via the slit 14*b*, the attachment block 14 is resiliently deformed so that the separated parts 14*c* come closer to each other. Then, the inner periphery surface of the axial bore 14*a* of the attachment block 14 is pressed against and secured to the leading end of the clamp rod 13.

As shown in FIGS. 8, 9, 12, and 13, the clamp arm 16 has a coupling part 16*a* at the base end and an arm part 16*b* extending from the coupling part 6*a* in an integrated manner. The coupling part 16*a* is detachably fitted on the attachment block 14 from above. The coupling part 16*a* has a rectangular form larger than the attachment block 14 in the plane view and has a thickness in the vertical direction nearly equal to the attachment block 14.

The coupling part 16*a* has in the center a vertically penetrating rectangular bore 16*c* in which the attachment block 14 is fitted from below. The coupling part 16*a* further has in the right wall facing the rectangular bore 16*c* a transversely penetrating notch 16*d* notched upward from the bottom and having a longitudinal dimension equal to the diameter to the head 15*a* of the block fastening bolt 15. The coupling part 16*a* also has two pairs of transversely elongated pin holes 16*e* in either end part in the longitudinal direction. The pin holes 16*e* in each pair are formed thorough the right and left sidewalls facing the rectangular bore 16*c* of the coupling part 16*a*. The pin holes 16*e* have the same diameter as the pin holes 14*e* of the attachment block 14.

The attachment block 14 is fitted in the rectangular bore 16*c* and the head 15*a* of the block fastening bolt 15 engages with the notch 16*d* for placing and support, whereby the clamp arm 16 is mounted on the attachment block 14 in position in the axial direction and in the rotative direction about the axis with the pin holes 14*b* and 16*e* being aligned. Here, the rectangular bore 16*c* and head 15*a* of the block fastening bolt 15 constitute the positioner.

Figure 14:
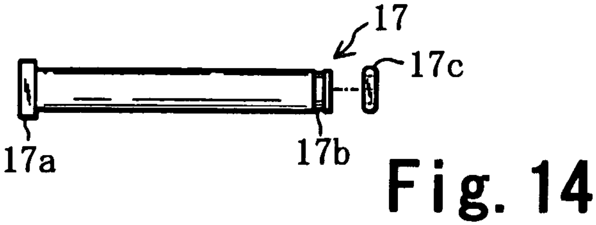
FIG. 14 is a front view of the clamping force transmission pin.

As shown in FIGS. 8, 9, and 14, a pair of clamping force transmission pins 17 has nearly the same diameter as the pin holes 14*e* and 16*e* and has a head 17*a* at the base end and an annular groove 17*b* at the leading end. With the clamp arm 16 being mounted on the attachment block 4, the pair of clamping force transmission pins 7 is inserted in the pin holes 14*e* and 16*e* and notch 14*f* in the direction parallel to the orthogonal direction to the axis. Then, stopper rings 17*c* are provided in the annular grooves 17*b* of the clamping force transmission pins 17 protruding outside the pin holes 16*e* for retention. The clamping force transmission pins 17 couple the positioned clam arm 6 to the attachment block 14 in an integrated manner.

According to the above described swing clamp apparatus 11, the attachment block 14 has an axial bore 14*a* in which the leading end of the clamp rod 13 is fitted and a slit 14*b* continued from the axial bore 14*a*, and a block fastening bolt 15 is provided to fasten the separated parts 14*c* via the slit 14*b* and resiliently deform the attachment block 14 so that it is pressed against and secured to the leading end of the clamp rod 13. Therefore, the attachment block 14 can reliably be pressed against and secured to the leading end of the clamp rod 13.

The attachment block 14 (separated parts 14*c*) has in the rear end part a notch 14*f* through which the clamping force transmission pin 17 is inserted. Therefore, even if the separated parts 14*c* are fastened and resiliently deformed by the block fastening bolt 15, the clamping force transmission pin 17 can smoothly be inserted in the notch 14*f*, whereby the clamp arm 16 is reliably coupled to the attachment block 14. As for the other features, the same advantages as Embodiment 1 can be obtained.

Modifications of Embodiments 1 and 2 will be described hereafter.

Figure 15:
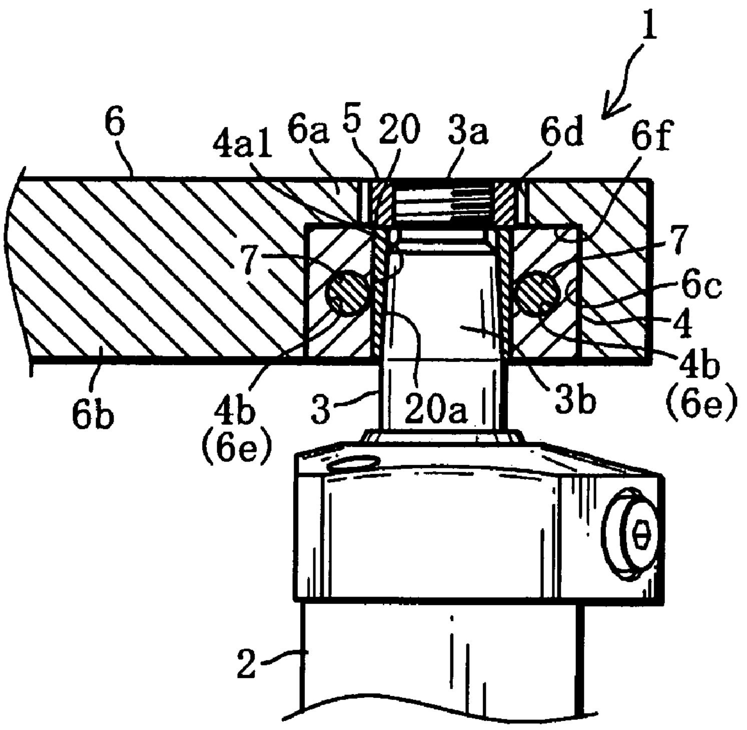
FIG. 15 is a vertical cross-sectional view of the swing clamp apparatus according to a modified embodiment.

1) In a modification of Embodiment 1, as shown in FIG. 15, the attachment block 14 has a straight axial bore 14*a*1 in place of the tapered axial bore 4*a*. Then, the attachment block 4 is provided with a tapered ring 20 that is fitted in the axial bore 4*a*1 and has a tapered axial bore 20*a* in which the tapered shaft part 3*b* of the clamp rod 3 is fitted.

Figure 16:
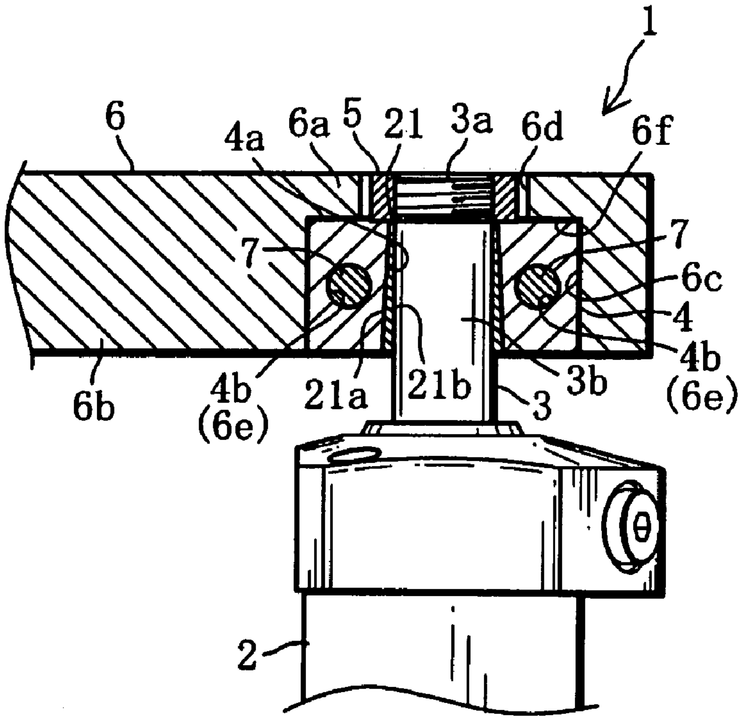
FIG. 16 is a vertical cross-sectional view of the swing clamp apparatus according to a modified embodiment.

2) In a modification of Embodiment 1, as shown in FIG. 16, the attachment block 14 is provided with a tapered ring 21 having a tapered outer periphery 21*a* and fitted in the tapered axial bore 4*a*. The tapered ring 21 has a straight axial bore 21*b* and the straight leading end of the clamp rod 3 is fitted in the axial bore 21*b*.

Figure 17:
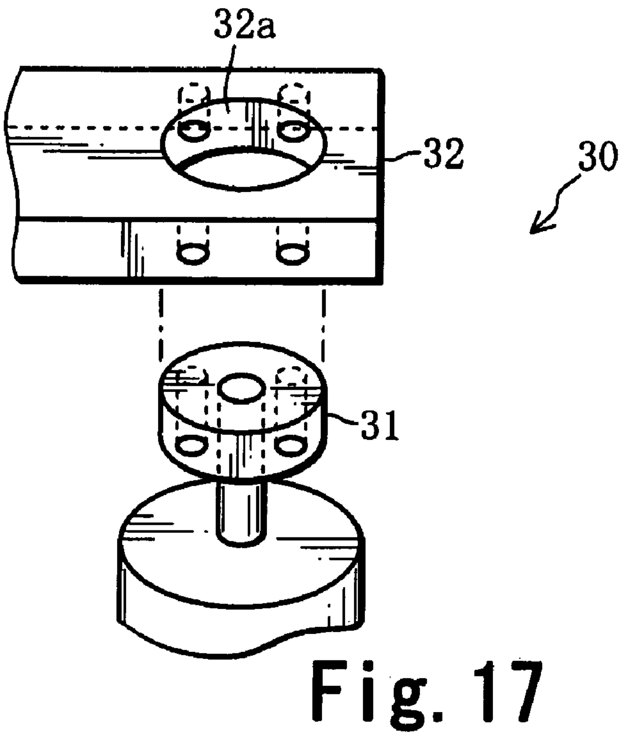
FIG. 17 is a perspective view of the swing clamp apparatus according to a modified embodiment.

3) As in a swing clamp apparatus 30 shown in FIG. 17, an attachment block 31 is in the form of a circular block and a clamp arm 32 has a circular bore 32*a* in which the attachment block 31 is fitted.

Figure 18:
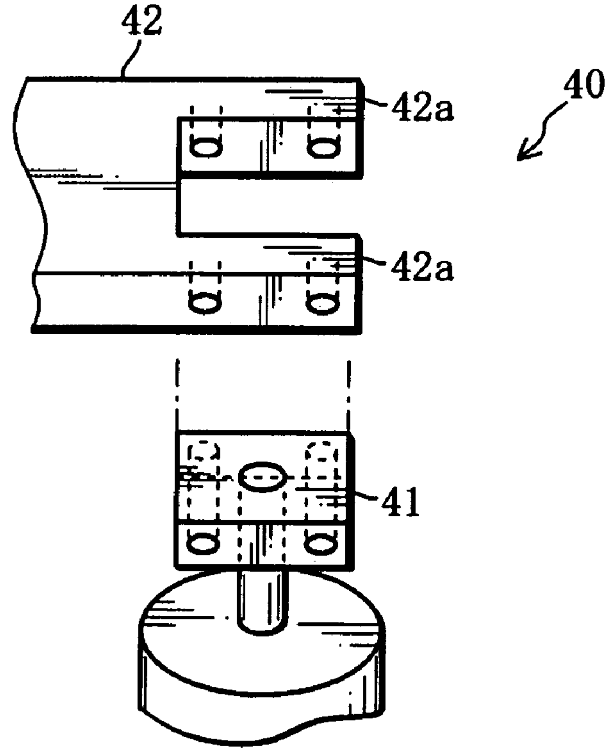
FIG. 18 is a perspective view of the swing clamp apparatus according to a modified embodiment.
Figure 19:
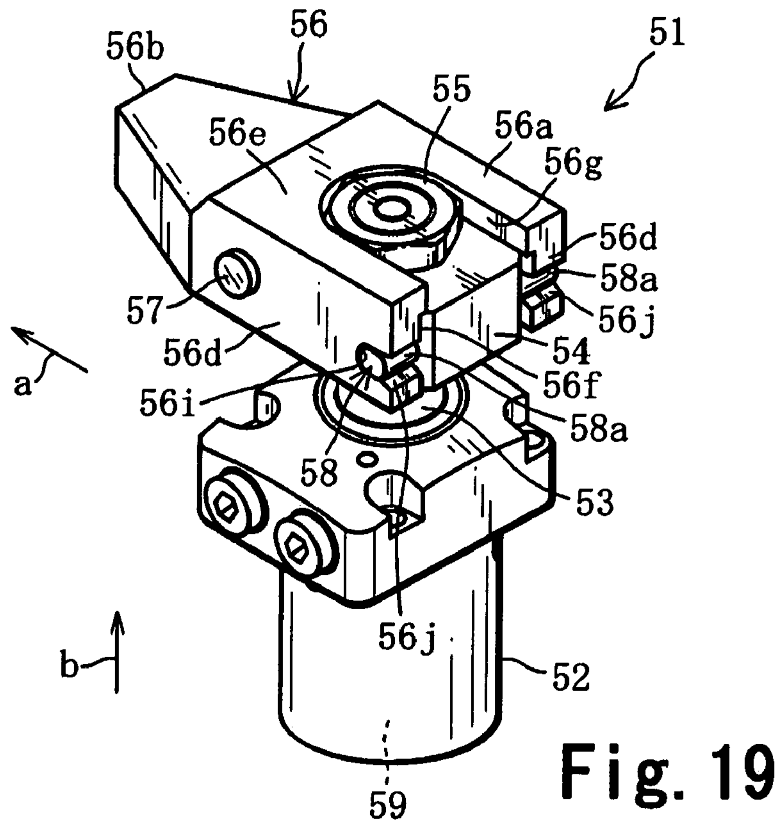
FIG. 19 is a perspective view of the swing clamp apparatus of Embodiment 3.

4) As in a swing clamp apparatus 40 shown in FIG. 18, an attachment block 41 is in the form of a rectangular block and a clamp arm 42 has at the base end a forked part having a pair of coupling block pieces 42*a*. The attachment block 41 is fitted between the pair of coupling block pieces 42*a*, whereby the clamp arm 41 is coupled to the attachment block 41.

5) A single clamping force transmission pin may be used to couple the positioned clamp arm to the attachment block in an integrated manner where possible in those having the above described positioner. Alternatively, three or more clamping force transmission pins may be used to couple the positioned clamp arm to the attachment block in an integrated manner.

Embodiment 3

As shown in FIGS. 19 to 26, a swing clamp apparatus 51 comprises a clamp body 52, a clamp rod 53, an attachment block 54, a block retaining nut 55, a clamp arm 56, a clamping force transmission pin 57, a clamping force transmission pin member 58, and a drive mechanism 59. Here, the explanation will be made with the assumption that the arrow a indicates the forward direction and the arrow b indicates the upward direction in FIG. 19.

As shown in FIGS. 19 to 22, the clamp body 52, clamp rod 53, block retaining nut 55, and drive mechanism 59 have the same functions as the clamp body 2, clamp rod 3, block retaining nut 5, and drive mechanism 8 of Embodiment 1. The swing clamp apparatus 51 has the same guide mechanism as of Embodiment 1. Therefore, the detailed explanation regarding the clamp body 52, clamp rod 53, block retaining nut 55, and drive mechanism 59 is omitted.

As shown in FIGS. 19 to 24, the attachment block 54 is in the form of a rectangular block. More specifically, the attachment block 54 has a rectangular form smaller than the clamp body 52 in the plan view and larger in the longitudinal direction than in the transverse direction, having a thickness in the vertical direction nearly equal to the vertical dimension of the tapered shaft part 53*b* of the clamp rod 53.

The attachment block 54 has in the center a vertically penetrating tapered axial bore 54*a* in which the tapered shaft part 53*b* of the clamp rod 53 is fitted. With the tapered shaft part 53*b* being fitted in the tapered axial bore 54*a*, the threaded part 53*a* at the top end of the clamp rod 53 protrudes upward from the attachment block 54. A block retaining nut 55 is screwed on the threaded part 53*a* from above, whereby the attachment block 54 is fastened to the clamp rod 53 by the block retaining nut 55.

The attachment block 54 has a pair of transversely elongated pin holes 54*b* and 54*c* formed transversely through the front and rear end parts. A clamping force transmission pin 57 is detachably inserted in the front pin hole 54*b* and a clamping force transmission pin member 58 is inserted in and secured to (for example pressed in) the rear pin hole 54*c*. The clamping force transmission pin member 58 constitutes a pair of right and left clamping force transmission pins 58*a*. The pair of pins 58*a* protrudes from the attachment block 54 in the directions away from each other (in the transverse direction). Each pin 58*a* has a pair of top and bottom smooth abutment surfaces 58*b* formed on the part of the outer periphery thereof that protrudes from the attachment block 54.

In other words, the attachment block 54 has a pair of pins 58*a* oriented in the direction parallel to the orthogonal direction to the axis and provided symmetrically in the width (transverse) direction of the clamp arm 56. The pins 58*a* are closer to the base end (rear end) of the clamp arm 56 than the clamping force transmission pin 57. The clamping force transmission pin 57 and clamping force transmission pin member 58 (a pair of pins 58*a*) are provided on either side of the clamp rod 53 in the longitudinal (front-to-back) direction of the clamp arm 56.

As shown in FIGS. 19 to 22, 25, and 26, the clamp arm 56 has a coupling part 56*a* at the base end and an arm part 56*b* extending from the coupling part 56*a* in an integrated manner. The coupling part 56*a* is detachably fitted on the attachment block 54. The coupling part 56*a* is larger than the attachment block 54 in the plan view and has a thickness in the vertical direction nearly equal to the vertical dimension of the threaded part 53*a* and tapered shaft part 53*b* of the clamp rod 53.

The coupling part 56*a* has an upright wall 56*c* at the front, a forked part 56*d* (a pair of right and left sidewalls 56*d*) extending backward from the upright wall 56*c*, and a top wall 56*e* extending over the upright wall 56*c* and forked part 56*d*. The upright wall 56*c*, forked part 56*d*, and top wall 56*e* form a housing recess 56*f* that is open at the bottom and rear end and in which the attachment block 54 is fitted. The top wall 56*e* has an opening 56*g* that is continued from the housing recess 56*f* and open at the top and rear end and in which the block retaining nut 55 is fitted.

The coupling part 56*a* has a pair of pin holes 56*h* formed transversely through the front end part of the forked part 56*d*. The pin holes 56*h* have nearly the same diameter as the pin hole 54*b* of the attachment block 54. The coupling part 56*a* further has a pair of pin engagements 56*i* in the rear end part of the forked part 56*d*. The engaging parts 56*i* engage with the pair of pins 58*a* to couple the mounted clamp arm 56 to the attachment block 54 in an integrated manner.

The pair of pin engagements 56*i* is provided symmetrically in the width direction (transverse direction) of the clamp arm 56, consisting of a pair of U-shaped grooves 56*i* notched in the forked part 56*d* from the base end (rear end). The U-shaped grooves 56*i* have a vertical dimension equal to the minimum diameter of the part of the pin 58*a* where the abutment surfaces 58*b* are formed. The forked part 56*d* has at the rear end tapered parts 56*j* continued from the rear ends of the U-shaped grooves 56*i* and having a vertical dimension increased toward the rear end.

The attachment block 54 is fitted in the housing recess 56*f*, the forked part 56*d* and top wall 56*e* (upright wall 56*c*) abut against the attachment block 54 and the pair of pins 58*a* of the attachment block 54 engages with the pair of pin engagements 56*i* at the rear end of the forked part 56*d*, whereby the clamp arm 56 is positioned and mounted on the attachment block 54 with the pin holes 54*b* and 56*h* being aligned.

As shown in FIGS. 19 to 22, the clamping force transmission pin 57 has nearly the same diameter as the pin holes 54*b* and 56*h* and has a head 57*a* at the base end and an annular groove 57*b* at the leading end. With the clamp arm 56 being mounted on the attachment block 54, the clamping force transmission pin 57 is inserted in the pin holes 54*b* and 56*h*. Then, a stopper ring 57*c* is provided in the annular groove 57*b* of the clamping force transmission pin 57 protruding outside the pin hole 56*h* for retention. The clamping force transmission pin 57 and pair of pins 58*a* couple the positioned clam arm 56 to the attachment block 54 in an integrated manner.

Figure 20:
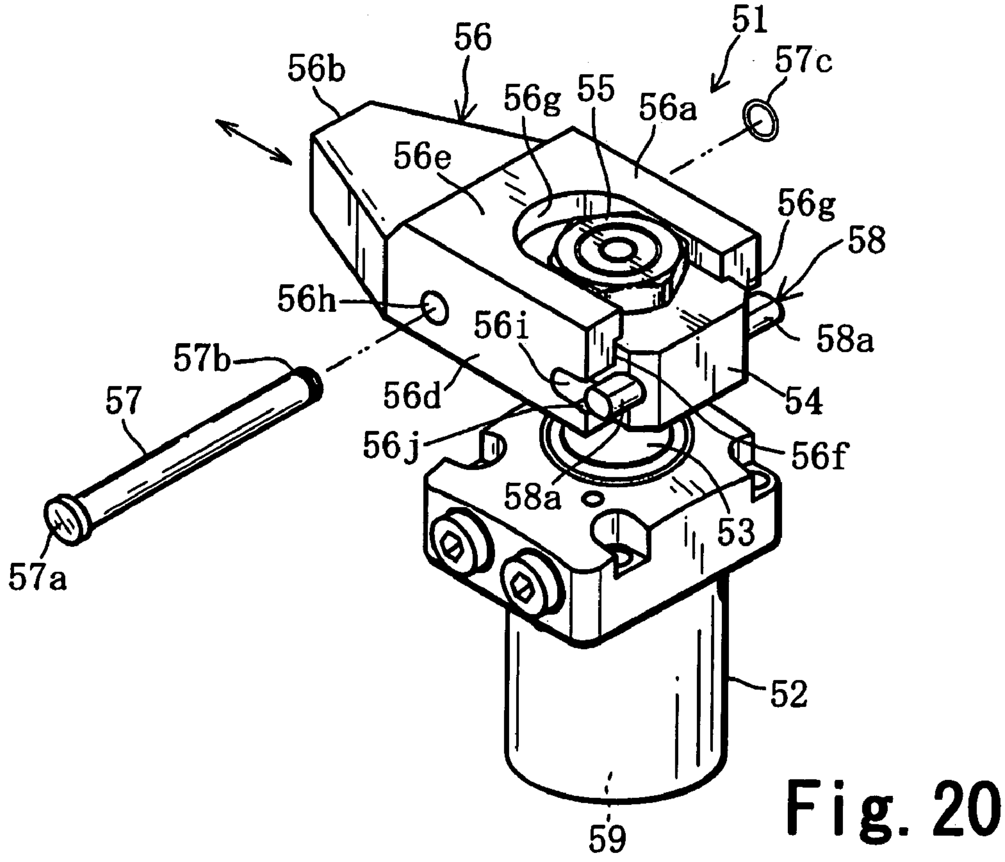
FIG. 20 is a perspective view of the swing clamp apparatus (with no clamp arm attached).
Figure 21:
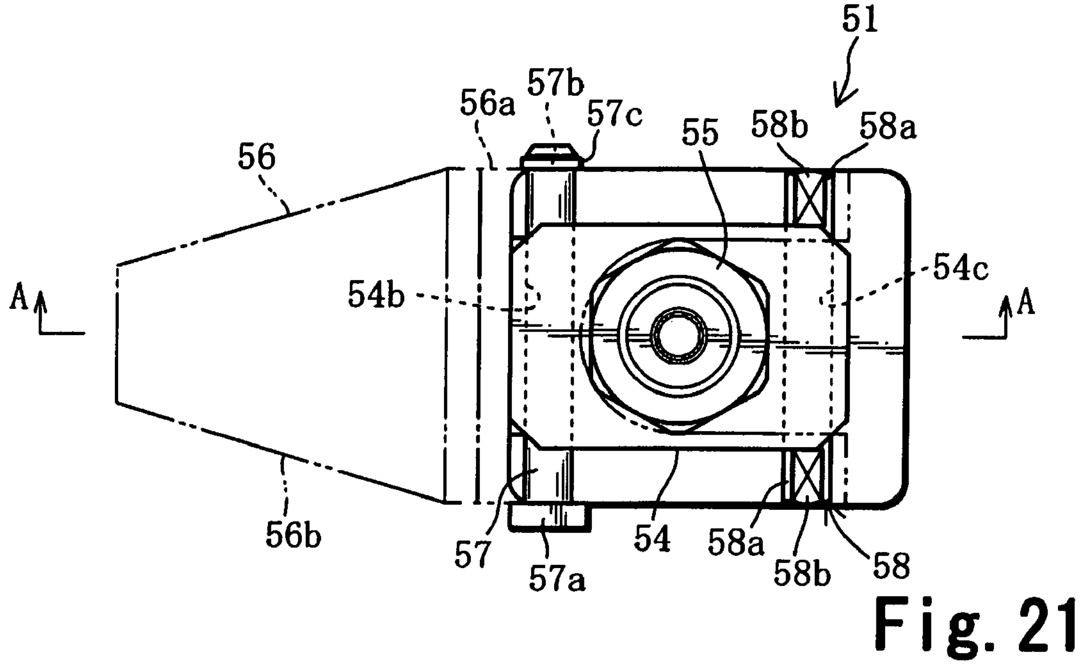
FIG. 21 is a plan view of a swing clamp apparatus.
Figure 22:
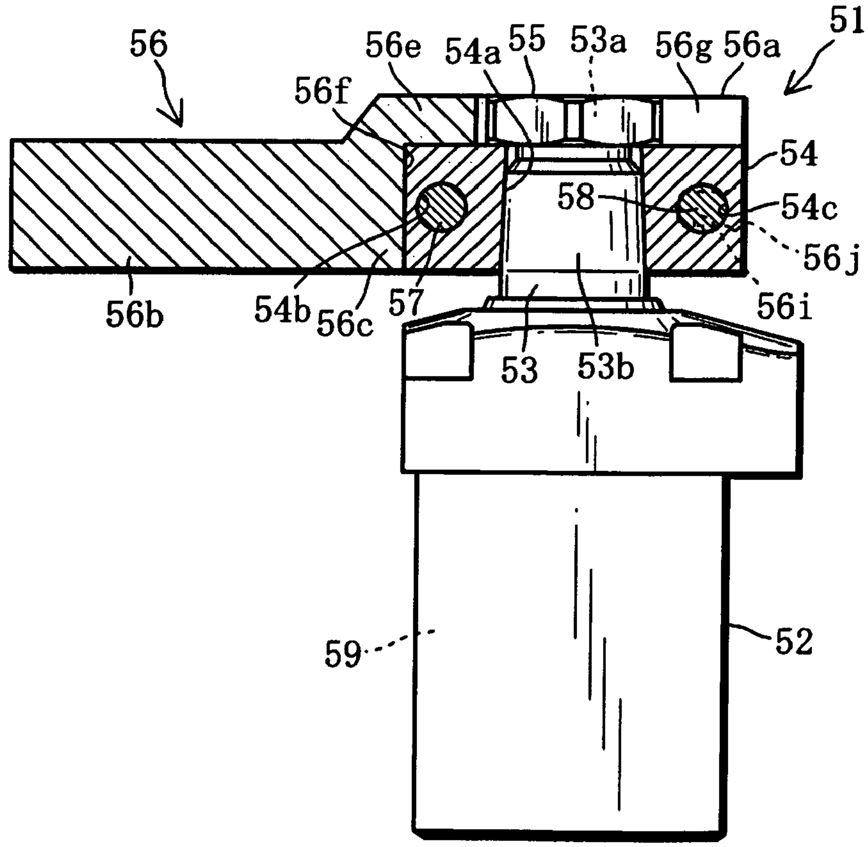
FIG. 22 is a cross-sectional view at the line A-A in FIG. 21.
Figure 23:
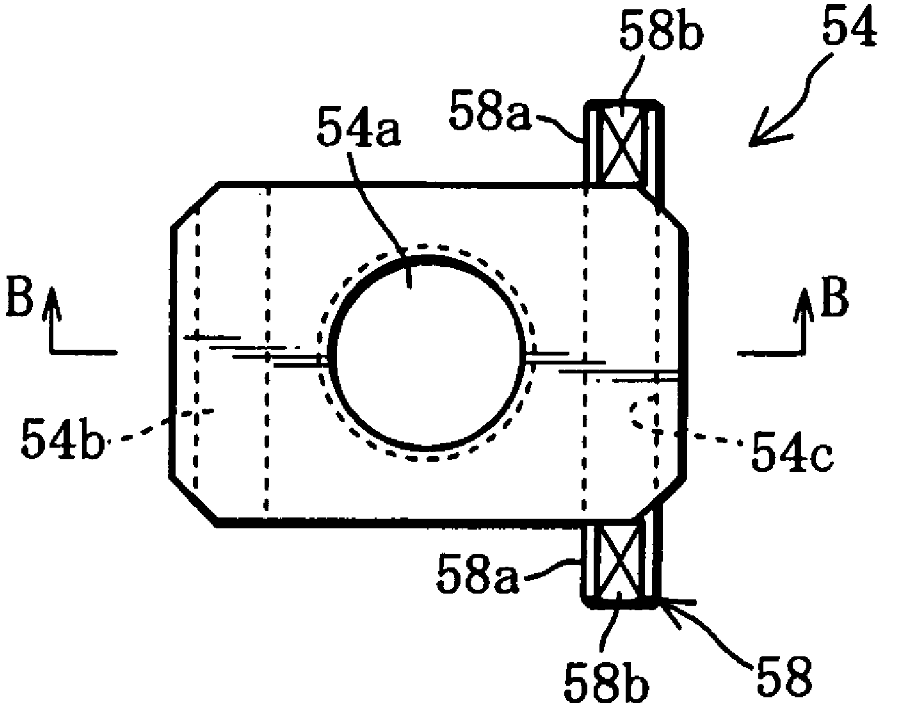
FIG. 23 is a plan view of the attachment block.
Figure 24:
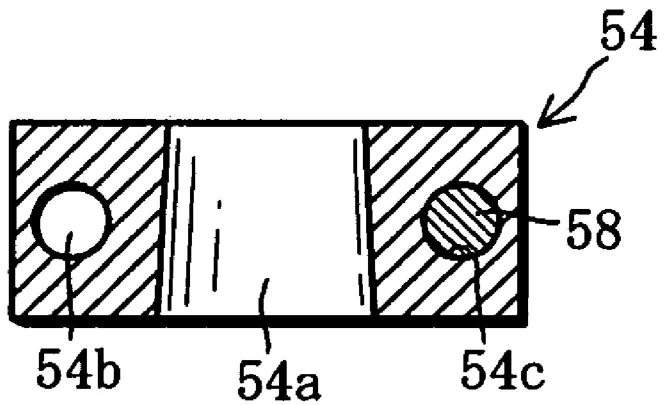
FIG. 24 is a cross-sectional view at the line B-B in FIG. 23.
Figure 25:
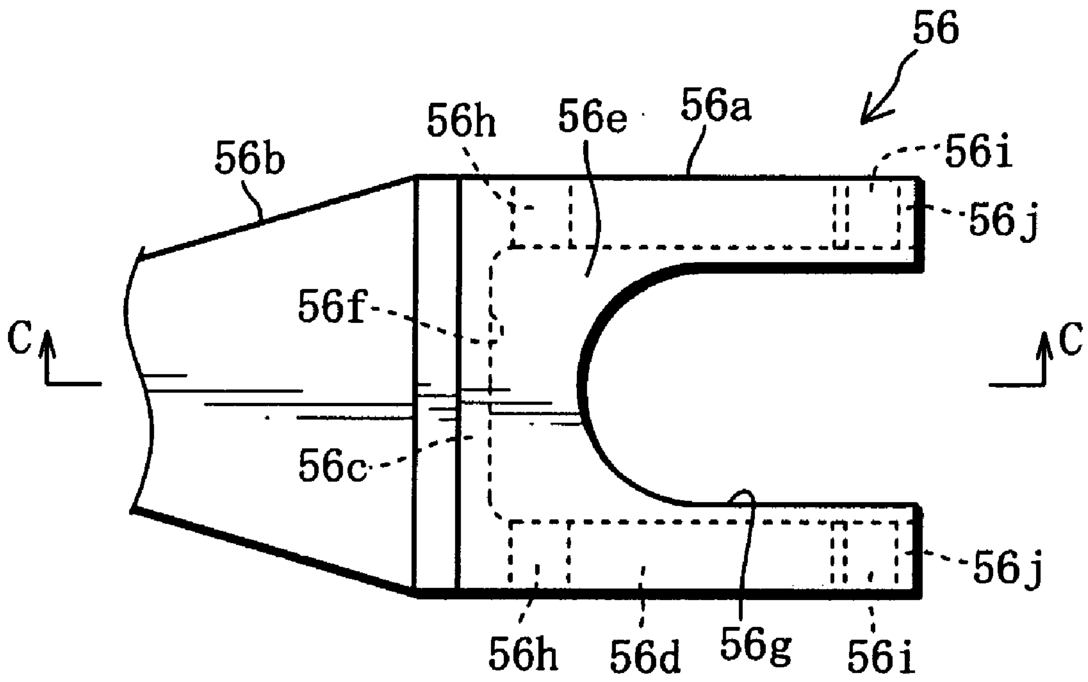
FIG. 25 is a plan view of the clamp arm.
Figure 26:
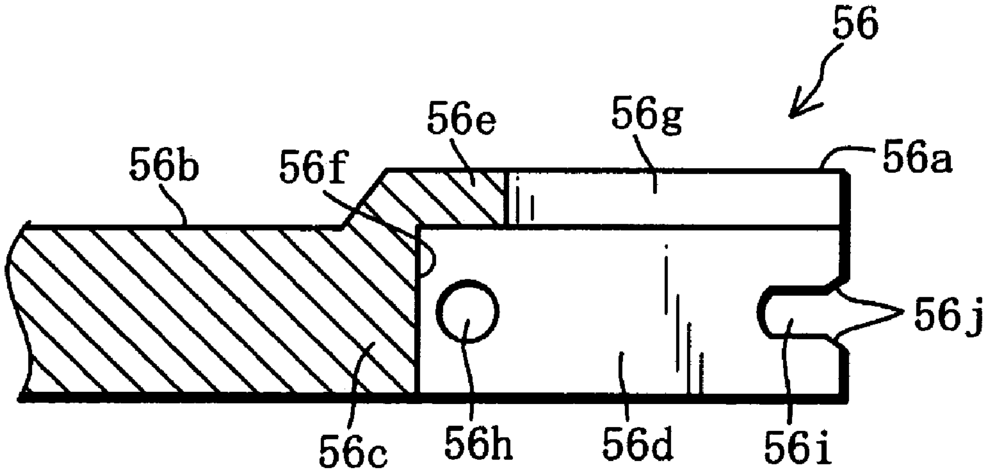
FIG. 26 is a cross-sectional view at the line C-C in FIG. 25.

Functions and advantages of the above described swing clamp apparatus 51 will be described hereafter. As shown in FIG. 20, for replacing the clamp arm 56, first, the clamping force transmission pin 57 is removed from the pin holes 54*b* and 56*h* of the attachment block 54 and clamp arm 56 to disengage the clamp arm 56 from the attachment block 54. Then, the clamp arm 56 is moved forward to disengage the pair of pins 58*a* from the pair of pin engagements 56*i* and then removed from the attachment block 54. Then, a new clamp arm 56 is mounted on the attachment block 54.

For mounting a new clamp arm 56, the clamp arm 56 is held horizontally and moved from the front to back of the attachment block 54, whereby the attachment block 54 is housed in the housing recess 56*f* and the pair of pins 58*a* engages with the pair of pin engagements 56*i*. Here, even if the vertical position of the clamp arm 56 in relation to the attachment block 54 is slightly shifted, the tapered parts 56*j* are guided by the pins 58*a* and the pair of pins 58*a* reliably engages with the pair of pin engagements 56*i*.

In this way, the clamp arm 56 is mounted on the attachment block 54 and the pin hole 54*b* of the attachment block 54 and the pin holes 56*h* of the clamp arm 56 are aligned. Then, the clamp force transmission pin 57 is inserted in the pin holes 54*b* and 56*h* to couple the positioned clamp arm 56 to the attachment 54 in an integrated manner.

As described above, for attaching/detaching the clamp arm 56 to/from the attachment block 54, the pair of pins 58*a* engages/disengages with/from the pin engagements 56*i* in the direction orthogonal to the axis and orthogonal to the center line of the pair of pins 58*a*. When the clamp arm 56 is mounted on the attachment block 54, the pair of pins 58*a* engages with the pin engagements 56*i* to couple the positioned clamp arm 56 to the attachment block 54 in an integrated manner. The clamping force of the clamp rod 53 is transmitted from the attachment block 54 to the clamp arm 56 via the pair of pins 58*a*.

With the attachment block 54 being pre-positioned and fixed to the clamp rod 53 at a desired position, the clamp arm 56 may be positioned and attached to the clamp rod 53 (attachment block 54) at a desired position. The pair of pins 58*a* engages/disengages with/from the pair of pin engagements 56*i* to attach/detach the clamp arm 56 to/from the attachment block 54 without attaching/detaching the pair of pins 58*a*. Consequently, the workload of replacing the clamp arm 56 can significantly be reduced. Particularly, it is significantly convenient that the workload of replacing the clamp arm 56 can remarkably be reduced where the clamp arm 56 is frequently replaced.

The attachment block 54 and clamp arm 56 have the pin holes 54*b* and 56*h* formed through them in the direction parallel to the center line of the pins 58*a* and the clamping force transmission pin 57 is inserted in these pin holes 54*b* and 56*h*. Therefore, the clamp arm 56 may be attached/detached to/from the attachment block 54 while the clamping force transmission pin 57 is removed from the pin holes 54*b* and 56*h*. After the clamp arm 56 is mounted on the attachment block 54, the clamping force transmission pin 57 is inserted in the pin holes 54*b* and 56*h* to couple the clamp arm 56 to the attachment block 54 in an integrated manner. Consequently, the clamping force of the clamp rod 53 is reliably transmitted from the attachment block 54 to the clamp arm 56 via the clamping force transmission pin 57 and pair of the pins 58*a*.

The pair of pins 58*a* and clamping force transmission pin 57 are provided on either side of the clamp rod 53 in the longitudinal direction of the clamp arm 56. Therefore, the clamping force of the clamp rod 53 can effectively be transmitted to the clamp arm 56 via the pair of pins 58*a* and clamping force transmission pin 57. A single clamping force transmission pin member 58 is inserted in the attachment block 54 and this clamping force transmission pin member 58 constitutes the pair of pins 58*a*. Therefore, the pair of pins 58*a* is easily provided to the attachment block 54 and shared by multiple replaceable clamp arms 56, which is significantly advantageous for production.

The attachment block 54 is in the form of a rectangular block and the clamp arm 56 has a forked part 56*d* at the base end. The part of the clamp arm 56 including the forked part 56*d* constitutes an open-bottom housing recess 56*f* in which the attachment block 54 is fitted. Therefore, for replacing the clamp arm 56, the clamp arm 56 is moved forward/backward to reliably disengage/engage the pair of pins 58*a* from/with the pair of pin engagements 56*i* and then detach/attach the clamp arm 56 from/to attachment block 54. Furthermore, the clamp arm 56 can reliably be positioned and mounted on the attachment block 54.

The pairs of pins 58*a* and pin engagements 56*i* are provided symmetrically in the width direction of the clamp arm 56. The pair of pins 58*a* is closer to the base end of the clamp arm 56 than the clamping force transmission pin 57 and protrudes from the attachment block 54 in the directions away from each other. The pair of pin engagements 56*i* consists of a pair of U-shaped grooves 56*i* notched in the forked part 56*d* from the base end. Therefore, the pair of pin engagements 56*i* having a simple structure allows the reliable engagement/disengagement of the pair of pins 58*a* with/from the pair of pin engagements 56*i*.

The pins 58*a* have on the outer periphery the abutments surfaces 58*b* that can abut against the smooth surfaces parallel to the orthogonal direction to the axis of the pin engagements 56*i*. Therefore, the area pressure the pins 58*a* receive from the pin engagements 56*i* may be reduced to prevent the pins 58*a* and pin engagement 56*i* from being damaged.

Embodiment 4

As shown in FIGS. 27 to 30, a swing clamp apparatus 61 comprises a clamp body 62, a clamp rod 63, an attachment block 64, a block retaining nut 65, a clamp arm 66, a clamping force transmission pin 67, a clamping force transmission pin member 68, and a drive mechanism 69. Here, the explanation is made with the assumption that the arrow a in FIG. 27 indicates the forward direction and the arrow b in FIG. 28 indicates the upward direction.

Figure 27:
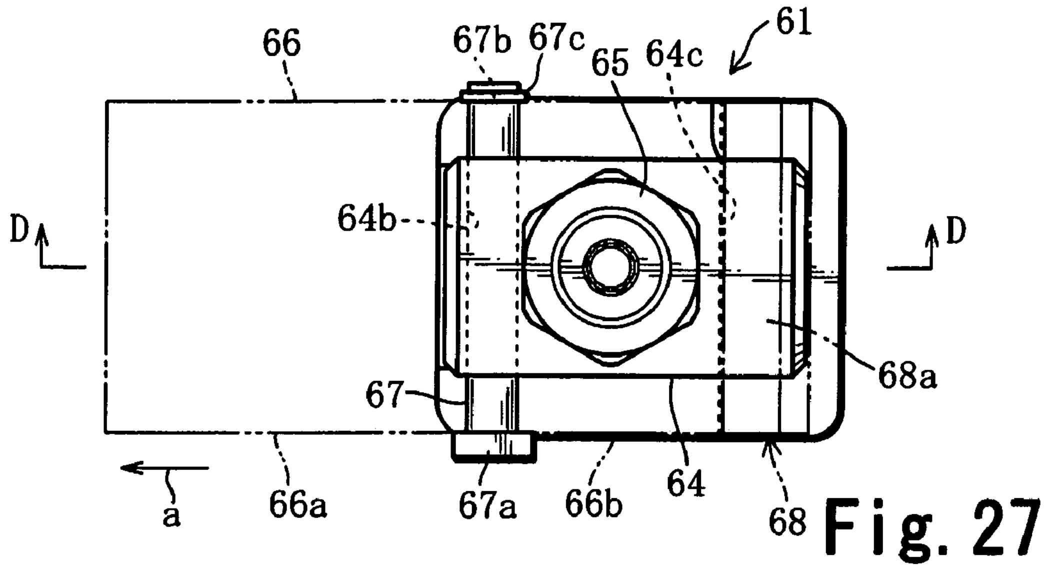
FIG. 27 is a plan view of the swing clamp apparatus of Embodiment 4.
Figure 28:
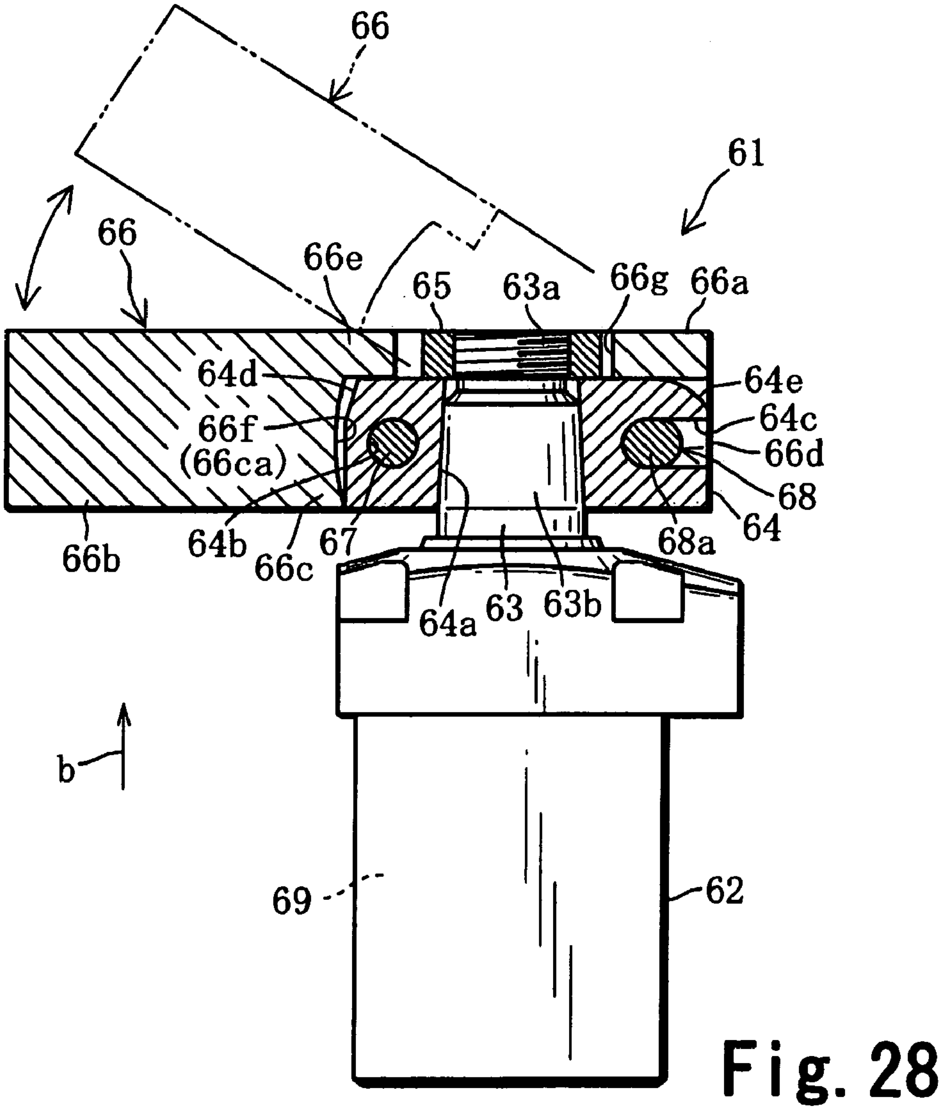
FIG. 28 is a cross-sectional view at the line D-D in FIG. 27.
Figure 29:
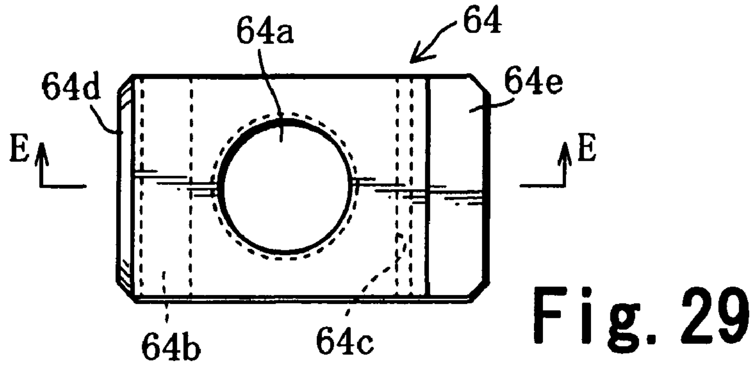
FIG. 29 is a plan view of the attachment block.
Figure 30:
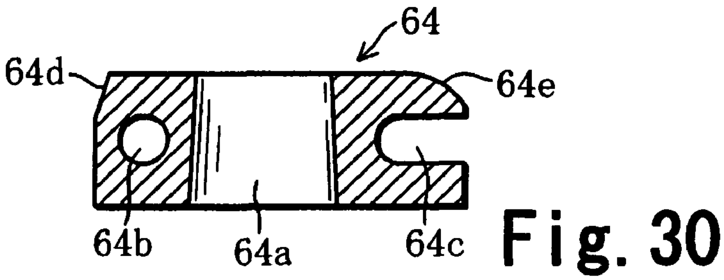
FIG. 30 is a cross-sectional view at the line E-E in FIG. 29.
Figure 31:
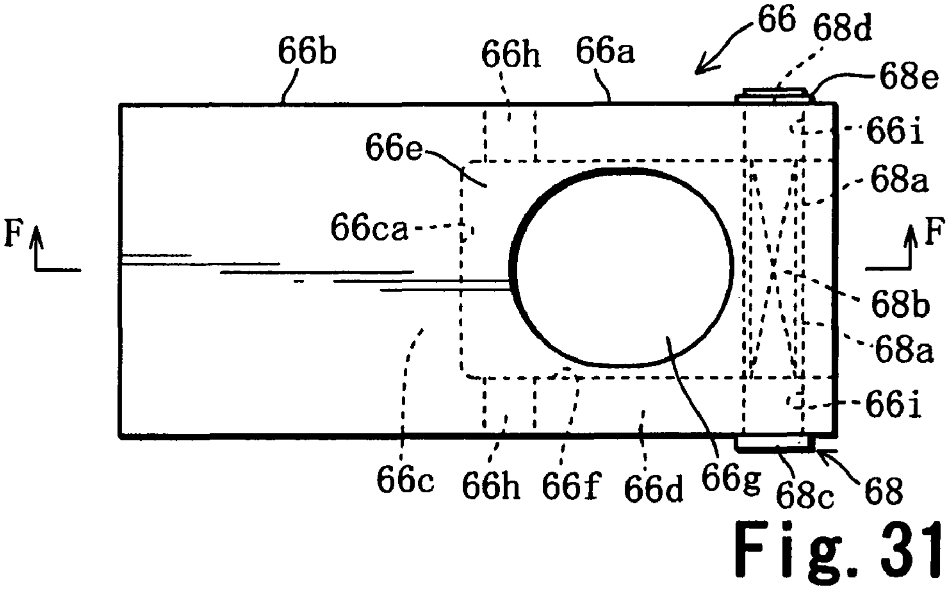
FIG. 31 is a plan view of the clamp arm.
Figure 32:
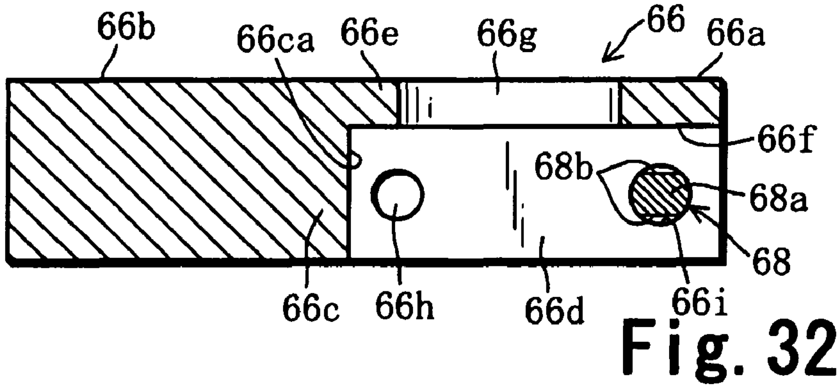
FIG. 32 is a cross-sectional view at the line F-F in FIG. 31.

As shown in FIGS. 27 and 28, the clamp body 62, clamp rod 63, block retaining nut 65, and drive mechanism 69 have the same functions as the clamp body 2, clamp rod 3, block retaining nut 5, and drive mechanism 8 of Embodiment 1. The swing clamp apparatus 61 has the same guide mechanism as of Embodiment 1. Therefore, the detailed explanation regarding the clamp body 62, clamp rod 63, block retaining nut 65, and drive mechanism 69 is omitted.

As shown in FIGS. 27 to 30, the attachment block 64 is in the form of a rectangular block. More specifically, the attachment block 64 has a rectangular form smaller than the clamp body 62 in the plan view and larger in the longitudinal direction than in the transverse direction, having a thickness in the vertical direction nearly equal to the vertical dimension of the tapered shaft part 63*b* of the clamp rod 63.

The attachment block 64 has in the center a vertically penetrating tapered axial bore 64*a* in which the tapered shaft part 63*b* of the clamp rod 63 is fitted. With the tapered shaft part 63*b* being fitted in the tapered axial bore 64*a*, the threaded part 63*a* at the leading end of the clamp rod 63 protrudes upward from the attachment block 64. A block retaining nut 65 is screwed on the threaded part 63*a* from above, whereby the attachment block 64 is fastened to the clamp rod 63 by the block retaining nut 65.

The attachment 64 has a transversely elongated pin hole 64*b* formed transversely through the front end part. The attachment 64 further has a pin engagement 64*c* consisting of a U-shaped groove 64*c* notched in the rear end part from the rear end across the entire width. A clamping force transmission pin 67 is detachably inserted in the pin hole 64*b* and a clamping force transmission pin member 58 (pin 68*a*) engages/disengages with/from the pin engagement 64*c*. The attachment block 64 has a sloped part 64*b* on the front end at the top and a curved part 64*e* on the rear end at the top.

As shown in FIGS. 27, 28, 31, and 32, the clamp arm 66 has a coupling part 66*a* at the base end and an arm part 66*b* extending from the coupling part 66*a* in an integrated manner. The coupling part 66*a* is detachably fitted on the attachment block 64. The coupling part 66*a* is larger than the attachment block 64 in the plan view and has a thickness in the vertical direction nearly equal to the vertical dimension of the threaded part 63*a* and tapered shaft part 63*b* of the clamp rod 63.

The coupling part 66*a* has an upright wall 66*c* at the front, a forked part 66*d* (a pair of right and left sidewalls 66*d*) extending backward from the upright wall 66*c*, and a top wall

66*e* extending over the upright wall 66*c* and forked part 66*d*. The upright wall 66*c*, forked part 66*d*, and top wall 66*e* form a housing recess 66*f* that is open at the bottom and rear end and in which the attachment block 64 is fitted. The top wall 66*e* has an opening 66*g* that is continued from the housing recess 66*f* and open at the top and in which the block retaining nut 65 is fitted.

The coupling part 66*a* has a pair of pin holes 66*h* formed transversely through the front end part of the forked part 66*d*. The pin holes 66*h* have nearly the same diameter as the pin hole 64*b* of the attachment block 64. The coupling part 66*a* further has a pair of pin engagements 66*i* formed transversely through the rear end part of the forked part 66*d*. A clamping force transmission member 68 is inserted in the pin holes 66*h*.

The clamping force transmission member 68 is rotatably mounted in the forked part 66*d* while retained by its head 68*c* and a stopper ring 68*e* provided in an annular groove 68*d* at its leading end. The clamping force transmission pin member 68 constitutes a clamping force transmission pin 68*a* capable of engaging/disengaging with/from the pin engagement 64*c*. The pin 68*a* has a pair of smooth abutment surfaces 68*b* facing in the opposite directions to each other between the forked part 66*d*. The part of the pin 68*a* where the abutment surfaces 68*b* are formed has the minimum diameter equal to the vertical dimension of the U-shaped groove 64*c*.

As described above, the pin 68*a* is provided to the clamp arm 66 in the direction parallel to the orthogonal direction to the axis (transverse direction) and closer to the base end (rear end) of the clamp arm 66 than the clamping force transmission pin 67. The clamping force transmission pin 67 and clamping force transmission pin member 68 (pin 68*a*) are provided on either side of the clamp rod 63 in the longitudinal (front-to-back) direction of the clamp arm 66.

The attachment block 64 is fitted in the housing recess 66*f*, the forked part 66*d* and top wall 66*e* abut against the attachment block 64, and the pin 68*a* of the clamp arm 66 engages with the pin engagement 64*c* at the rear end of the coupling part 64*e*, whereby the clamp arm 66 is positioned and mounted on the attachment block 64 with the pin holes 54*b* and 56*h* being aligned.

As shown in FIGS. 27 and 28, the clamping force transmission pin 67 has nearly the same diameter as the pin holes 64*b* and 66*h* and has a head 67*a* at the base end and an annular groove 67*b* at the leading end. With the clamp arm 66 being mounted on the attachment block 64, the clamping force transmission pin 67 is inserted in the pin holes 64*b* and 66*h*. Then, a stopper ring 67*c* is provided in the annular groove 67*b* of the clamping force transmission pin 67 protruding outside the pin hole 66*h* for retention. The clamping force transmission pin 67 and pin 68*a* couple the positioned clamp arm 66 to the attachment block 64 in an integrated manner.

Functions and advantages of the above described swing clamp apparatus 61 will be described hereafter. As shown in FIG. 28, for replacing the clamp arm 66, first, the clamping force transmission pin 67 is removed from the pin holes 64*b* and 66*h* of the attachment block 64 and clamp arm 66 to disengage the clamp arm 66 from the attachment block 64. Then, the clamp arm 66 is rotated upward about the pin 68*a*.

Here, in order to rotate the clamp arm 66 about the pin 68*a*, the clamping force transmission pin member 68 is rotatably mounted in the clamp arm 66. In order to prevent mutual interference between the attachment block 64 and the clamp arm 66, the attachment block 64 has the sloped part 64*d* on the front end at the top and the curved part 64*e* on the rear end at the top. The inner surface of the upright wall 66*c* of the clamp arm 66 forms a partial cylindrical surface 66*ca* having the center line coinciding with the pin 68*a*.

The clamp arm 66 is rotated upward until the bottom end of the upright wall 66*c* becomes above the attachment block 64. Then, the clamp arm 66 is moved backward to disengage the pin 68*a* from the pin engagement 64*c* and removed from the attachment block 64. Then a new clamp arm 66 is mounted on the attachment block 64.

For mounting a new clamp arm 66, the clam arm 66 is moved forward in nearly the same orientation as the removed clamp arm 66 to engage the pin 68*a* with the pin engagement 64*c*. Then, the clamp arm 66 is rotated downward about the pin 68*a* to house the attachment block 64 in the housing recess 66*f*. Then, the clamp arm 66 is mounted on the attachment block 64 with the pin hole 64*b* of the attachment block 64 and the pin holes 66*h* of the clamp arm 66 being aligned. Then, the clamping force transmission pin 67 is inserted in the pin holes 64*b* and 66*h*, whereby the positioned clamp arm 66 is coupled to the attachment block 64 in an integrated manner.

According to the swing clamp apparatus 61, for attaching/detaching the clamp arm 66 to/from the attachment block 64, the pin 68*a* engages/disengages with/from the pin engagement 64*c* in the direction orthogonal to the axis and orthogonal to the center line of the pin 68*a*. When the clamp arm 66 is mounted on the attachment block 64, the pins 68*a* engage with the pin engagements 64*c*, whereby the positioned clamp arm 66 is coupled to the attachment block 64 in an integrated manner. The clamping force of the clamp rod 63 may be transmitted from the attachment block 64 to the clamp arm 66 via the pin 68*a*.

The pin 68 is closer to the base end of the clamp arm 66 than the clamping force transmission pin 67 and provided across the forked part 66*d* of the clamp arm 66. The pin engagement 64*c* consists of a U-shaped groove 64*c* notched in the attachment block 64 from the base end. The pin engagement 64*c* having a simple structure allows the reliable engagement/disengagement of the pin 68*a* with/from the pin engagement 64*c*. As for the other features, the same advantages as the swing clamp apparatus 51 can be obtained. Modifications of Embodiments 3 and 4 will be described hereafter.

1) In a modification of Embodiment 3, the clamping force transmission pin member 58 is omitted and a pair of separated pins 58*a* may be provided to the attachment block 54 in an integrated manner.

2) In a modification of Embodiment 4, the clamping force transmission pin member 68 is omitted and a pair of pins protruding from the forked part 66*d* in the opposite directions to each other may be provided to the clamp arm 66. In such a case, a pair of separated right and left engaging parts 64*c* consisting of U-shaped grooves 64*c* formed in the attachment block 64 may be provided in the manner that at least the pins can engage with them.

3) In a modification of Embodiment 4, the attachment block 64 has at the rear end a tapered part continued from the U-shaped groove 64*c* and having a vertical dimension increased toward the rear end.

4) In a modification of Embodiments 3 and 4, the pins 58*a* or 68*a* have no abutment surfaces 58*b* or 68*b*, having a circular cross-section.

Various modifications other than those described above may be made to the swing clamp apparatuses of Embodiments 1 to 4 without departing from the scope of the present invention and the swing clamp apparatus of the present invention is applicable to various swing clamp apparatuses.

What is claimed is:

1. A swing clamp apparatus comprising a clamp body, a clamp rod supported by the clamp body reciprocally in an axial direction thereof and rotatably around an axis thereof, a clamp arm attached to a leading end of the clamp rod, and a drive mechanism coupled to the clamp rod that reciprocates and rotates the clamp rod to switch the clamp arm between an unclamping position and a clamping position where the clamp arm is retracted in the axial direction and swung about the axis in relation to the unclamping position, an attachment block fixed to the leading end of said clamp rod and to which the clamp arm is detachably attached; and at least one clamping force transmission pin inserted in said attachment block and clamp arm in the direction parallel to the orthogonal direction to the axis for coupling the positioned clamp arm to said attachment block in an integrated manner.

2. The swing clamp apparatus according to claim 1, wherein said attachment block has a positioner for positioning the clamp arm in the axial direction and in a rotative direction about the axis.

3. The swing clamp apparatus according to claim 1 or 2, wherein said clamp arm is fitted on said attachment block.

4. The swing clamp apparatus according to claim 2, wherein said attachment block is formed as a rectangular block and said clamp arm has a rectangular bore in which said attachment block is fitted in.

5. The swing clamp apparatus according to claim 1 or 2, wherein said clamp rod has at a leading end a tapered shaft part having a diameter deceased toward a tip and said attachment block has a tapered axial bore in which said tapered shaft part is fitted in.

6. The swing clamp apparatus according to claim 1 or 2, wherein said pin has on the outer periphery abutment surfaces that abut against smooth surfaces parallel to an orthogonal direction to an axis of said pin engagement.

7. The swing clamp apparatus according to claim 1, wherein said attachment block is enabled to be fitted from a direction of the axis of said clamp rod in a bore formed in said clamp arm and said attachment block fixed on a leading end of said clamp rod is fitted in said bore to position said clamp arm.

8. The swing clamp apparatus according to claim 1, wherein said clamp arm has a bore formed therethrough in an axial direction of the clamp rod, said bore being open along an arc portion of the bore in transverse to the axial direction, wherein said attachment block is fitted in said bore to position the clamp arm relative to the clamp rod.

9. The swing clamp apparatus according to claim 8, wherein said attachment block has a positioner for positioning the clamp arm in the axial direction and in a rotative direction about the axis.

10. The swing clamp apparatus according to claim 1, wherein said clamp rod has an uninterrupted circular surface contour at a transverse plane of the rod relative to the axial direction, and wherein the attachment block may be fixedly positioned in said transverse plane at any rotative position relative to the axis of the clamp rod to position the clamp arm relative to the clamp rod in a rotative direction.

11. A swing clamp apparatus comprising a clamp body, a clamp rod supported by the clamp body reciprocally in an axial direction thereof and rotatably around an axis thereof, a clamp arm attached to a leading end of the clamp rod, a drive mechanism coupled to the clamp rod that reciprocates and rotates the clamp rod to switch the clamp arm between an unclamping position and a clamping position where the clamp arm is retracted in the axial direction and swung about the axis in relation to the unclamping position, an attachment block fixed to the leading end of said clamp rod and to which the clamp arm is detachably attached;

a clamping force transmission pin provided to one of said attachment block and clamp arm in a direction parallel to an orthogonal direction to the axis;

a pin engagement provided to the other of said attachment block and clamp arm and engaging with said pin for coupling the clamp arm mounted to said attachment block in an integrated manner;

wherein when said clamp arm is attached/detached to/from said attachment block, said pin engages/disengages with/from said pin engagement in a direction orthogonal to the axis and to the center line of said pin.

12. The swing clamp apparatus according to claim 11, wherein a pin hole is formed through said attachment block and clamp arm in the direction parallel to the center line of said pin and a clamping force transmission pin is inserted in said pin hole.

13. The swing clamp apparatus according to claim 12, wherein said pin and clamping force transmission pin are provided on either side of said clamp rod in a longitudinal direction of said clamp arm.

14. The swing clamp apparatus according to any one of claims 11, 12, or 13, wherein a clamping force transmission pin member is inserted in one of said attachment block and clamp arm and said clamping force transmission pin member constitutes said pin.

15. The swing clamp apparatus according to any one of claims 11, 12, or 13, wherein said attachment block is formed as a rectangular block, said clamp arm has a forked part in a base end part, and a part of said clamp arm including said forked part forms a housing recess that is open at a base end and in which said attachment block is fitted.

16. The swing clamp apparatus according to claim 15, wherein pairs of said pins and pin engagements are symmetrically provided in a width direction of said clamp arm, said pair of pins is closer to the base end of said clamp arm than said clamping force transmission pin and protrudes from said attachment block in the directions away from each other, and said pair of pin engagements consists of a pair of U-shaped grooves notched in said forked part of said clamp arm from the base end.

17. The swing clamp apparatus according to claim 15, wherein said pin is closer to the base end of said clamp arm than said clamping force transmission pin and provided across said forked part of said clamp arm, and said pin engagement consists of a U-shaped groove notched in said attachment block from the base end.

18. A swing clamp apparatus comprising:

a clamp body;

a clamp rod supported by the clamp body reciprocally in an axial direction thereof and rotatably around an axis thereof;

a clamp arm attached to a leading end of the clamp rod;

a drive mechanism coupled to the clamp rod that reciprocates and rotates the clamp rod to switch the clamp arm between an unclamping position and a clamping position where the clamp arm is retracted in the axial direction and swung about the axis in relation to the unclamping position;

an attachment block fixed to the leading end of said clamp rod and to which the clamp arm is detachably attached; and at least one clamping force transmission pin inserted in said attachment block and clamp arm in the direction parallel to the orthogonal direction to the axis for coupling the positioned clamp arm to said attachment block in an integrated manner; and wherein said attachment block has an axial bore in which a leading end of said clamp rod is fitted and a separator continued from said axial bore and a fastening bolt is provided to fasten and elastically deform said attachment block via said separator, whereby the attachment block is pressed against and secured to the leading end of said clamp rod.

* * * * *